United States Patent
Irie

(10) Patent No.: US 8,958,647 B2
(45) Date of Patent: Feb. 17, 2015

(54) REGISTRATION DETERMINATION DEVICE, CONTROL METHOD AND CONTROL PROGRAM THEREFOR, AND ELECTRONIC APPARATUS

(71) Applicant: OMRON Corporation, Kyoto (JP)

(72) Inventor: Atsushi Irie, Nara (JP)

(73) Assignee: OMRON Corporation, Kyoto (JP)

( * ) Notice: Subject to any disclaimer, the term of this patent is extended or adjusted under 35 U.S.C. 154(b) by 161 days.

(21) Appl. No.: 13/722,217

(22) Filed: Dec. 20, 2012

(65) Prior Publication Data

US 2013/0243328 A1 Sep. 19, 2013

(30) Foreign Application Priority Data

Mar. 15, 2012 (JP) .................. 2012-058991

(51) Int. Cl.
  *G06K 9/46* (2006.01)
  *G06K 9/00* (2006.01)
(52) U.S. Cl.
  CPC .............. *G06K 9/46* (2013.01); *G06K 9/00926* (2013.01)
  USPC ........................................ 382/192; 382/118
(58) Field of Classification Search
  USPC ................... 382/115, 118, 190, 192
  See application file for complete search history.

(56) References Cited

U.S. PATENT DOCUMENTS

| | | | | |
|---|---|---|---|---|
| 2007/0237367 A1* | 10/2007 | Yamato et al. | ................. | 382/118 |
| 2008/0014563 A1* | 1/2008 | Visani et al. | .................. | 434/155 |
| 2010/0205177 A1* | 8/2010 | Sato et al. | ..................... | 707/737 |
| 2010/0296739 A1* | 11/2010 | Li et al. | .......................... | 382/203 |
| 2011/0091113 A1* | 4/2011 | Ito et al. | ......................... | 382/197 |
| 2011/0158536 A1* | 6/2011 | Nakano et al. | ................ | 382/190 |

FOREIGN PATENT DOCUMENTS

| | | |
|---|---|---|
| EP | 1 416 427 A2 | 5/2004 |
| JP | 2000-123178 A | 4/2000 |
| JP | 2000-222576 A | 8/2000 |
| JP | 2004-046697 A | 2/2004 |
| JP | 03-564984 B2 | 9/2004 |
| JP | 2004-302645 A | 10/2004 |

(Continued)

OTHER PUBLICATIONS

Korean Office Action for Application No. 10-2012-0154696 issued Feb. 25, 2014 (1 Page).

(Continued)

*Primary Examiner* — Samir Ahmed
(74) *Attorney, Agent, or Firm* — Nutter McClennen & Fish LLP

(57) ABSTRACT

Whether an obtained candidate face image is registered or not is appropriately determined. A similarity degree calculating unit calculates the degree of similarity between a candidate face image extracted by a face image extracting unit and a registration face image registered in a storage unit. An in-class variance calculating unit calculates an in-class variance of the degree of similarity of the registered person identified by a registered person identifying unit, and an inter-class variance calculating unit calculates an inter-class variance of the degree of similarity of each registered person registered in the storage unit. A variance ratio calculating unit calculates a variance ratio between the inter-class variance and the in-class variance, and on the basis of the calculated variance ratio, a registration determining unit determines whether a target face image is to be registered or not.

10 Claims, 15 Drawing Sheets

(56) References Cited

FOREIGN PATENT DOCUMENTS

| JP | 2007-004321 A | 1/2007 |
|---|---|---|
| JP | 04-177629 B2 | 11/2008 |
| JP | 04-314016 B2 | 8/2009 |
| JP | 04-705511 B2 | 6/2011 |
| JP | 04-705512 B2 | 6/2011 |

OTHER PUBLICATIONS

[No Author] Anonymous: "Linear discriminant analysis—Wikipedia, the free encyclopedia" wikipedia. Jul. 25, 2014. pp. 1-8. Retrieved from the Internet: URL:http://en.wikipedia.orgjwiki/Linear discriminant analysis—[retrieved-on Jul. 25, 2014].

Extended European Search Report for EP 12 19 7322 mailed Aug. 5, 2014. (12 pages).

Huang et al: "Solving the small sample size problem of LDA" Pattern Recognition. 2002. Proceedings. 16th International Conference on Quebec City. QUE .o Canada Aug. 11-15, 2002. Los Alamitos. CA. USA.IEEE Comput. Soc. US. vol. 3. Aug. 11, 2002. pp. 29-32.

Rattani et al: "Template Update Methods in Adaptive Biometric Systems: A Critical Review" Jun. 2, 2009. Advances in Biometrics. Springer Berlin Heidelberg. Berlin. Heidelberg. p. 847-856.

Sakata et al: "Fingerprint Authentication Based on Matching Scores with Other Data". Jan. 5, 2006. Advances in Biometrics Lecture Notes in Computer Science ;LNCS. Springer. Berlin. DE. pp. 280-286.

\* cited by examiner

REGISTRATION DETERMINATION DEVICE, CONTROL METHOD AND CONTROL PROGRAM THEREFOR, AND ELECTRONIC APPARATUS

BACKGROUND OF THE INVENTION

1. Technical Field

The present invention relates to a registration determination device, a control method and a control program therefor, and an electronic apparatus for determining whether to register a candidate image, i.e., a registration candidate of a target image, as a registered image registered in advance in order to perform image recognition of a certain target.

2. Related Art

In recent years, collation of a target image such as an image of a face included in a taken image is used in various fields. In the past, it is necessary for a user to register a target image in advance and delete a registered target image, and as a result, the user has to do cumbersome task. Accordingly, it is desired to automatically perform the registration processing and/or the delete processing.

For example, in a fingerprint collation device described in Japanese Patent Application Laid-Open No. 2000-123178 (published on Apr. 28, 2000), first, fingerprint feature data are extracted from a fingerprint feature data storage unit for each group. Subsequently, the fingerprint feature data which are input from the fingerprint image input device and of which feature is calculated are compared with the extracted fingerprint feature data, and a determination is made as to whether both of them have similar data. When there are similar data, a notification is given that registration is made to a group other than the group in question.

In a face image collation device described in Japanese Patent No. 4705512 (issued on Jun. 22, 2011), first, a registration face image and a candidate face image are stored in advance. Subsequently, when a person in question is identified based on the registration face image, the degree of similarity between three or more face images and the input face image is calculated, and when an intermediate degree of similarity which is neither the maximum nor the minimum is more than an update threshold value, the input face image is replaced with a candidate face image of which degree of similarity is the minimum.

In a face image collation device described in Japanese Patent No. 4705511 (issued on Jun. 22, 2011), first, a registration face image and a candidate face image are stored in advance. Subsequently, when a person in question is identified based on the registration face image, a mutual degree of similarity which is an average of the degrees of similarity of one candidate face images and the other candidate face images of three or more candidate face images is calculated for each of them, and a candidate face image of which mutual degree of similarity is the maximum is identified. Subsequently, when the degree of similarity of the identified candidate face image and an input image is determined to be more than a predetermined update threshold value, the candidate face image of which degree of similarity to the input face image is the minimum is replaced.

In a person identification device described in Japanese Patent No. 3564984 (issued on Jun. 18, 2004), first, registration data of an identified person is stored in advance. Subsequently, a physical feature is read, and the read physical feature and the stored registration data are compared and collated with each other, and the degree of similarity is determined. When the determined degree of similarity is equal to or more than a re-registration determination condition level which is set at the degree of similarity higher than a discrimination level for identifying a person in question, the registration data are re-registered.

In a person recognizing device described in Japanese Patent No. 4314016 (issued on May 22, 2009), first, living body information of multiple persons being recognition targets is retained in advance as registration information. Subsequently, living body information of a person being a recognition target is obtained, and the obtained living body information and each of the multiple pieces of registered retained registration information are collated with each other to obtain multiple degrees of similarity, and the person in question is recognized on the basis of the multiple obtained degrees of similarity. Subsequently, a determination is made as to whether a difference of multiple degrees of similarity among the multiple obtained degrees of similarity is equal to or more than a predetermined threshold value, and when the difference is determined to be equal to or more than the predetermined threshold value, the retained registration information is updated based on the obtained living body information.

In an individual authentication device described in Japanese Patent No. 4177629 (issued on Aug. 29, 2008), when there are input data which are determined to be another person in registered persons, individual identifying information is input, and when the degree of collation between a taken face image and face data corresponding to input individual identifying information is equal to or more than a predetermined value, face data are updated.

In an individual authentication device described in Japanese Patent Application Laid-Open No. 2004-046697 (published on Feb. 12, 2004), a registered person and a non-registered person are used to calculate a threshold value used in face authentication. More specifically, average values and standard deviation values of score values of all pairs (registered persons, non-registered persons) are calculated, and a threshold value is determined based on the values.

In a face registration device described in Japanese Patent Application Laid-Open No. 2004-302645 (published on Oct. 28, 2004), when a registration face image is confirmed as being a person in question as a result of discrimination as to whether an input face image matches any one of registration face images, times before and after this confirmation are adopted as registration times, and input face images which are input between the registration times are registered as registration face images.

However, in Japanese Patent Application Laid-Open No. 2000-123178, a new registered person similar to grouped registered persons data is not registered because this may cause false recognition. Moreover, similarity (variance) of data within the data of the person in question is not referenced, and therefore, data that allows the other person and the person in question to be easily distinguished may not be registered.

In Japanese Patent Nos. 4705512, No. 4705511, No. 3564984, No. 4314016, and No. 4177629, distance relationship between the person in question and the other person is not taken into consideration. For this reason, face image data similar to another person may be registered, and in this case, false recognition may be caused. In a case of Japanese Patent Application Laid-Open No. 2004-046697, the values are not obtained for each individual, and therefore, likelihood of being a person in question is not taken into consideration. In Japanese Patent Application Laid-Open No. 2004-302645, the data of the other person are not taken into consideration, and therefore, data which is likely to be a person in question but is not likely to be the other persons cannot be registered, and as a result, data which may be mistaken as another person may be registered.

The present invention is made in view of above problems, and it is an object of the present invention to provide a registration determination device that can appropriately register an obtained target image.

SUMMARY

In accordance with one aspect of the present invention, a registration determination device according to the present invention is a registration determination device for determining whether to register a candidate image which is a registration candidate of a target image, as a registered image that is registered in advance in order to perform image recognition of a target, and the registration determination device includes a storage unit configured to store registration information that is at least one of a feature quantity and image data of the registered images in association with discrimination information for discriminating the target, a candidate obtaining part configured to obtain the candidate image, an identifying part configured to identify discrimination information corresponding to the candidate image obtained by the candidate obtaining part, a feature quantity calculating part configured to calculate a feature quantity of the candidate image obtained by the candidate obtaining part, an in-class variance calculating part configured to calculate, with regard to the candidate image and a registered image in a same class corresponding to the discrimination information identified by the identifying part, an in-class variance of a feature quantity of the candidate image calculated by the feature quantity calculating part and a feature quantity based on the registration information of the registered image, or an in-class variance of a degree of similarity between the feature quantity of the candidate image and the feature quantity of the registered image, an inter-class variance calculating part configured to calculate, with regard to registered images in a plurality of classes respectively corresponding to a plurality of pieces of discrimination information, an inter-class variance of the feature quantity of the candidate image and feature quantities of the registered images based on the registration information of the registered images or the inter-class variance of the degree of similarity between the feature quantity of the candidate image and feature quantities of the registered images, a variance ratio calculating part configured to calculate a variance ratio which is a ratio between the in-class variance calculated by the in-class variance calculating part and the inter-class variance calculated by the inter-class variance calculating part, and a registration part, wherein when the calculated variance ratio calculated by the variance ratio calculating part satisfies a preset condition that has been set, the registration part registers the candidate image as the registered image to the storage unit in such a manner that the registration information of the registered image is associated with the discrimination information identified by the identifying part.

In accordance with another aspect of the present invention, a control method for a registration determination device according to the present invention is the control method for determining whether to register a candidate image which is a registration candidate of a target image, as a registered image that is registered in advance in order to perform image recognition of a target, and the control method includes a candidate obtaining step for obtaining the candidate image, an identifying step for identifying discrimination information corresponding to the candidate image obtained in the candidate obtaining step, a feature quantity calculating step for calculating a feature quantity of the candidate image obtained in the candidate obtaining step, an in-class variance calculating step for calculating, with regard to the candidate image and a registered image in a same class corresponding to the discrimination information identified in the identifying step, an in-class variance of a feature quantity of the candidate image calculated in the feature quantity calculating step and a feature quantity based on registration information of the registered image stored in a storage unit that stores the registration information that is at least one of a feature quantity and image data of the registered image in association with discrimination information for discriminating each target, or an in-class variance of a degree of similarity between the feature quantity of the candidate image and the feature quantity of the registered image, an inter-class variance calculating step for calculating, with regard to registered images in a plurality of classes respectively corresponding to a plurality of pieces of discrimination information, an inter-class variance of the feature quantity of the candidate image and feature quantities of the registered images based on the registration information of the registered images or the inter-class variance of the degree of similarity between the feature quantity of the candidate image and feature quantities of the registered images, a variance ratio calculating step for calculating a variance ratio which is a ratio between the in-class variance calculated in the in-class variance calculating step and the inter-class variance calculated in the inter-class variance calculating step, and a registration step, in which when the calculated variance ratio calculated in the variance ratio calculating step satisfies a preset condition, the candidate image is registered as the registered image to the storage unit in such a manner that the registration information of the registered image is associated with the discrimination information identified in the identifying step.

According to the above configuration and the above method, first, the candidate image is obtained, and the discrimination information corresponding to the obtained candidate image is identified, and on the other hand, the feature quantity of the obtained candidate image is calculated. Subsequently, with regard to the candidate image and the registered image in the same class corresponding to the identified discrimination information, the in-class variance between the calculated feature quantity of the candidate image and the feature quantity based on the registration information of the registered image stored in the storage unit is calculated, or the in-class variance of the degree of similarity between the feature quantity of the candidate image and the feature quantity of the registered image is calculated. With regard to registered images in a plurality of classes respectively corresponding to a plurality of pieces of discrimination information, an inter-class variance of the feature quantity or the inter-class variance of the degree of similarity is calculated. Subsequently, the variance ratio which is a ratio between the calculated in-class variance and the calculated inter-class variance is calculated, and when the calculated variance ratio satisfies a preset condition, the candidate image is registered as the registered image to the storage unit in such a manner that the registration information of the registered image is associated with the identified discrimination information.

Therefore, whether the candidate image is registered as the registered image is determined using the variance ratio which is the ratio between the in-class variance and the inter-class variance. More specifically, whether the candidate image is registered or not is determined in view of relationship with the registered image of the same target (class) as the candidate image and relationship with the registered image of a different target (class) from the candidate image. As a result, the determination can be made appropriately.

It should be noted that the feature quantity is a vector quantity, and the degree of similarity is a scalar quantity. With the feature quantity, for example, the inter-class variance and the in-class variance can be obtained by calculating the distance of each vector which is the feature quantity.

When the storage unit stores the feature quantity of the registered image, the feature quantity of the registered image read from the storage unit may be used as the feature quantity based on the registration information of the registered image. On the other hand, when the storage unit stores image data of the registered image, the feature quantity based on the registration information of the registered image may be calculated based on image data of the registered image read from the storage unit. The variance ratio may be the in-class variance/the inter-class variance, or may be the inter-class variance/the in-class variance.

The registration determination device may further include an operation unit configured to receive operation from a user, wherein the identifying part may identify the discrimination information corresponding to the candidate image, on the basis of operation received from the user via the operation unit.

Alternatively, the identifying part may identify the discrimination information corresponding to the candidate image by collating the candidate image obtained by the candidate obtaining part and the registered image stored in the storage unit. In this case, the user does not have to perform any operation, and this improves the convenience.

In the registration determination device according to the present invention, the storage unit may store the registered image in association with the discrimination information in advance. In this case, even when the user registers a target image of only one target, the inter-class variance can be calculated and the variance ratio can be calculated, using the registered image registered in advance. Therefore, whether the candidate image is registered or not can be determined appropriately.

When there are one registered image or a few registered images associated with the discrimination information corresponding to the candidate image, the in-class variance calculating part preferably uses a default in-class variance instead of calculating the in-class variance. In this case, it is possible to avoid the problems of being unable to calculate an appropriate in-class variance because there is only one registered image or a few registered images.

In the registration determination device according to the present invention, the in-class variance calculating part may calculate, with regard to the candidate image and the registered image in a same class corresponding to the discrimination information identified by the identifying part, an in-class variance of a feature quantity of the candidate image calculated by the feature quantity calculating part and a feature quantity based on the registration information of the registered image, and the inter-class variance calculating part calculates an inter-class variance of a feature quantity with regard to the candidate image and the registered image in the same class corresponding to the discrimination information identified by the identifying part and a registered image in another class corresponding to other discrimination information. In this case, the candidate image is deemed as the registered image, and whether the candidate image is registered or not is determined by calculating the variance ratio which is a ratio between the in-class variance and the inter-class variance. Therefore, the determination can be made in view of the candidate image.

The registration determination device according to the present invention may further include a combination generating part configured to generate a combination including at least two registered images in each class with regard to registered images in the plurality of classes respectively corresponding to the plurality of pieces of discrimination information, and a registration update part using the in-class variance calculating part, the inter-class variance calculating part, and the variance ratio calculating part to update the registration information of the registered image in the storage unit with registration information of a registered image of a combination satisfying a preset condition, among the variance ratios between the in-class variance and the inter-class variance corresponding to each class, which are calculated for each combination generated by the combination generating part. In this case, a registered image which need not be registered can be deleted from the storage unit, and this can avoid waste of resources. In addition, an optimum combination can be generated, and the accuracy of authentication can be improved.

It should be noted that the above actions and effects can be achieved using an electronic apparatus having the registration determination device configured as described above.

A control program can cause a computer to execute each step of the registration determination device. Further, the control program can be executed on any computer by recording the control program to a computer-readable recording medium.

As described above, the registration determination device according to the present invention determines whether a candidate image is to be registered in view of relationship with a registered image of the same target as the candidate image and relationship with a registered image of a different target from the candidate image, and therefore, there is an advantage in that the determination can be made appropriately.

DETAILED DESCRIPTION

First Embodiment

Figure 1:
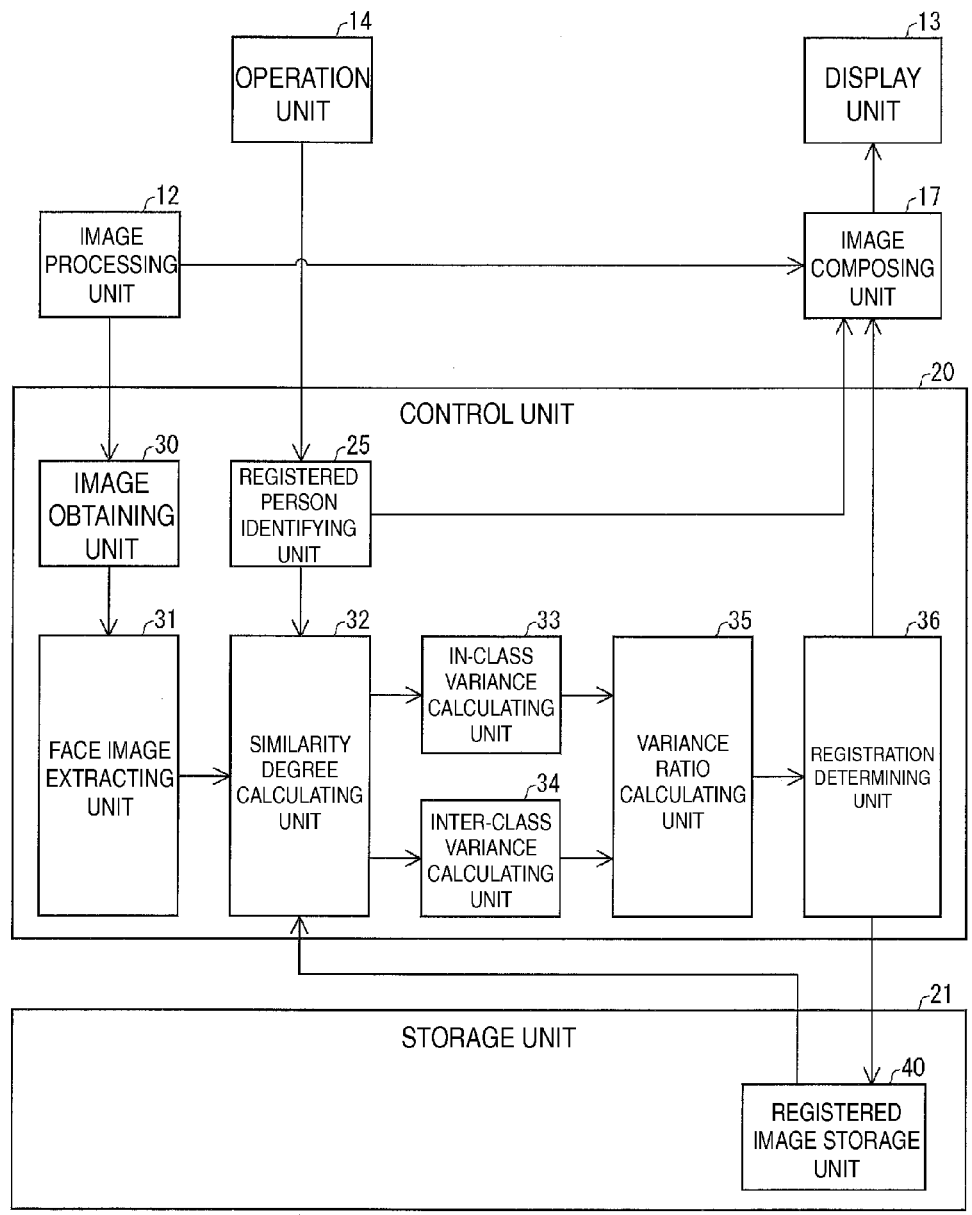
FIG. 1 is a block diagram illustrating a schematic configuration of a control unit and a storage unit in a digital camera according to an embodiment of the present invention.
Figure 2:
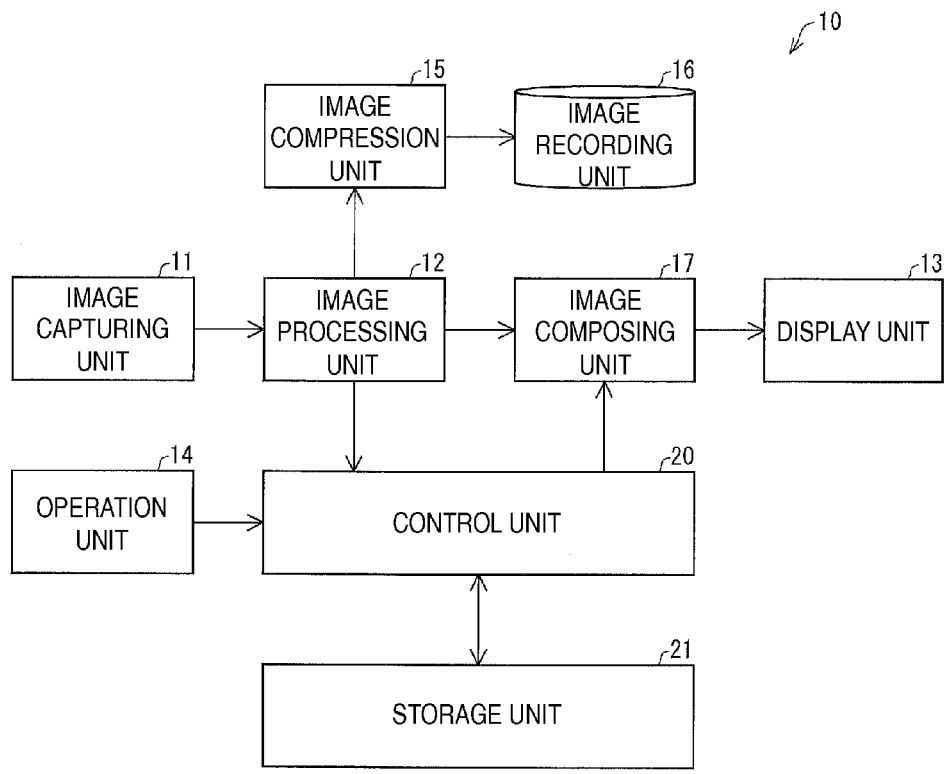
FIG. 2 is a block diagram illustrating a schematic configuration of the digital camera.

An embodiment of the present invention will be explained with reference to FIGS. 1 to 4. FIG. 2 is a block diagram illustrating a schematic configuration of the digital camera which is the present embodiment. As shown in the figure, in a digital camera (electronic apparatus, registration determination device) 10, a captured image captured by an image-capturing unit 11 and processed by an image processing unit 12 is displayed as a live-view image on a display unit 13. When a user presses a shutter button (not shown) of the operation unit 14, the digital camera 10 causes the captured image processed by the image processing unit 12 to be compressed by the image compression unit 15, and thereafter, the captured image is stored to an image recording unit 16.

Subsequently, the details of the digital camera 10 of the present embodiment will be explained. As described above, the digital camera 10 includes an image capturing unit 11, an image processing unit 12, a display unit 13, an operation unit 14, an image compression unit 15, an image recording unit 16, and an image composing unit 17. Further, as shown in FIG. 2, the digital camera 10 includes a control unit 20 and a storage unit 21.

The image capturing unit 11 captures an image of a subject, and includes, for example, an optical system such as a lens group, a diaphragm, and a image-capturing device, and a circuit system such as an amplifier and A/D converter. Examples of image-capturing devices include image sensors such as a CCD and a CMOS (Complementary Metal-oxide Semiconductor). The image capturing unit 11 generates a captured image by capturing an image, converts the image into data of the captured image, and transmits the data to the image processing unit 12.

The image processing unit 12 performs image processing such as matrix operation, γ correction, adjustment of white balance, on the data of the captured image given by the image capturing unit 11. The image processing unit 12 generates data of captured images for display, recording, and face detection, from the data of the captured image processed, and transmits each of them to the display unit 13, the image compression unit 15, and the control unit 20. The data of the captured image for display and face detection may be the same.

The image composing unit 17 composes an image by combining an image (for example, OSD (On-Screen Display) image) given by the control unit 20 with the captured image given by the image processing unit 12. The image composing unit 17 transmits the data of the composite image which is a combined image to the display unit 13.

The display unit 13 is made of a display device such as an LCD (liquid crystal display device), an EL organic (Electroluminescence) display, and a plasma display. The display unit 13 displays and outputs various kinds of information such as characters and images, on the basis of the data of the composite image given by the image composing unit 17.

The operation unit 14 is configured to receive various kinds of input given by the user according to user's operation, and is made of input buttons, a touch panel, and other input devices. The operation unit 14 converts information about operation performed by the user into operation data, and transmits the operation data to the control unit 20. Other examples of input devices include pointing devices such as a keyboard, a numerical keypad, and a mouse.

The image compression unit 15 compresses the data of the captured images given by the image processing unit 12 in accordance with methods such as JPEG (Joint Photographic Experts Group) and MPEG (Moving Picture Expert Group). The image compression unit 15 records the compressed data of the captured image to the image recording unit 16.

The image recording unit 16 records information, and in particular, the image compression unit 15 records the compressed data of the captured image. The image recording unit 16 is constituted by a nonvolatile storage device such as a flash memory and a hard disk.

The control unit 20 centrally controls operation of various kinds of configuration in the digital camera 10. The control unit 20 is constituted by a computer such as a CPU (Central Processing Unit) and a memory. Operation control of the various kinds of configuration is performed by causing a computer to execute a control program. This program may be used upon, for example, being read from a removable medium such as a flash memory recording the program, or may be used upon, for example, being read from a hard disk to which the program is installed. Alternatively, the program may be downloaded, installed to a hard disk and the like, and executed. The details of the control unit 20 will be explained later.

The storage unit 21 includes a nonvolatile storage device such as a flash memory, a ROM (Read Only Memory), and the like, and a volatile storage device such as a RAM (Random Access Memory). The contents recorded in the nonvolatile storage device include the control program, an OS (operating system) program, various other kinds of programs, an operation setting value of the image processing unit 12, and character data which have been input. Examples of operation setting values of the image processing unit 12 includes a value of white balance which is set when the device is shipped or when the device is maintained, and various kinds of parameter values concerning image processing when the brightness of the captured image is adjusted. On the other hand, the contents stored in the volatile storage device include a work file, a temporary file, and the like. The details of the storage unit 21 will be explained later.

Figure 3:
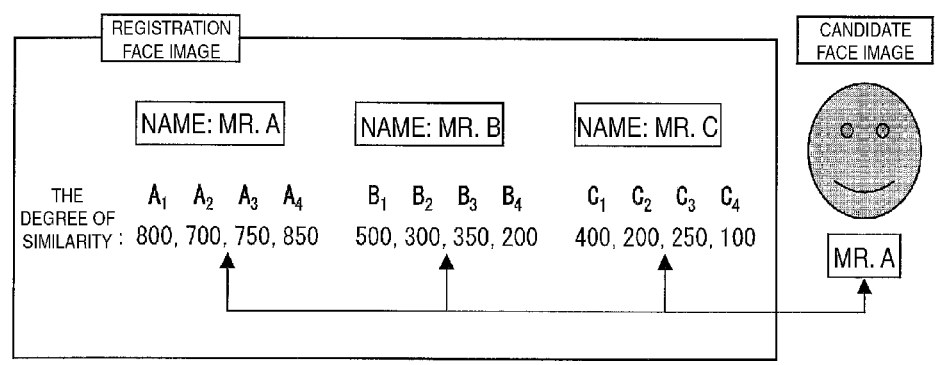
FIG. 3 is a figure illustrating overview of an example of processing according to the embodiment.

In this case, a specific example of processing executed by the control unit 20 in the present embodiment will be explained with reference to FIG. 3. The control unit 20 of the present embodiment determines whether a candidate face image (candidate image) which is a registration candidate of a target face image (target image) is to be registered as a registration face image (registered image) registered in advance in order to perform face recognition (image recognition) of a certain person (target). FIG. 3 is a figure illustrating overview of an example of processing of the control unit 20 according to the present embodiment.

As shown in FIG. 3, data of face images of multiple persons are registered to the storage unit 21 as data of registration face images (registration information). In the example of FIG. 3, for each of the three persons, i.e., Mr. A, Mr. B, and Mr. C (registered persons), data of four registration face images are registered to the storage unit 21.

First, a determination is made as to whether a subject for imaging is any one of the registered persons, on the basis of an instruction given by a user. Hereinafter, the identified registered person is referred to as an identified registered person. Subsequently, when a new face image of the identified registered person is received as a candidate face image, first, the degree of similarity (authentication score) between the received candidate face image and each of all the registration face images registered in the storage unit 21 is calculated. In the example of FIG. 3, the degree of similarity between the candidate face image of Mr. A and each of the registration face images of all the registered persons is calculated. Therefore, totally 12 pieces of the degrees of similarity are calculated.

Subsequently, on the basis of the degrees of similarity thus calculated, an in-class variance $\sigma_{Wi}^2$ of the degree of similarity concerning the identified registered person and an inter-class variance $\sigma_B^2$ of the degrees of similarity concerning all the registered persons are calculated. In this case, the in-class variance $\sigma_{Wi}^2$ represents spreading of elements included in the same class, and is calculated from the following expression (1). In the present embodiment, the degree of similarity is used instead of a feature vector x.

[Math 1]

$$\sigma_{wi}^2 = \frac{1}{n_i} \sum_{x \in X_i} (x - m_i)^t (x - m_i) \quad (1)$$

(where x denotes a feature vector, $m_i$ denotes the i-th class average vector, $x_i$ denotes a set in the i-th class, and $n_i$ denotes the number of elements in the i-th class.)

The inter-class variance $\sigma_B^2$ represents spreading of inter-class, and is calculated from the following expression (2).

[Math 2]

$$\sigma_B^2 = \frac{1}{n} \sum_{i=1}^{c} n_i (m_i - m)^t (m_i - m) \quad (2)$$

(where m denotes an average vector of all classes, and n denotes the number of elements of all the classes.)

In the example of FIG. 3, the in-class variance $\sigma_{Wi}^2$ (=3125) is calculated from the four pieces of the degrees of similarity concerning Mr. A. On the other hand, the inter-class variance $\sigma_B^2$ ($\approx$54479.17) is calculated from the twelve pieces of the degrees of similarity concerning Mr. A, B, and C.

Subsequently, a variance ratio $J_{sigma}$ is calculated using the following expression (3). The variance ratio $J_{sigma}$ is a ratio of the calculated inter-class variance $\sigma_B^2$ with respect to the calculated in-class variance $\sigma_{Wi}^2$. In the example of FIG. 3, the variance ratio $J_{sigma}$ is 54479.17/3125$\approx$17.4.

$$J_{sigma} = \sigma_B^2 / \sigma_{Wi}^2 \quad (3).$$

Then, a determination is made as to whether the candidate face image is to be registered or not on the basis of the calculated variance ratio $J_{sigma}$ and a criterion that has been set. When the candidate face image is determined to be registered, the data of the candidate face image are registered to the storage unit 21 as the data of the registration face image of the identified registered person. The details of the criterion for determination will be explained later. Alternatively, $\sigma_{Wi}^2/\sigma_B^2$ may be used as a variance ratio.

Therefore, the digital camera 10 of the present embodiment determines whether the target face image is registered or not as the registration face image, using the variance ratio which is the ratio of the inter-class variance $\sigma_B^2$ with respect to the in-class variance $\sigma_{Wi}^2$. More specifically, a determination is made as to whether the target face image is to be registered or not in view of the relationship with a registration face image of the same target and a relationship with a registration face image of a different target. Therefore, the determination can be made appropriately.

Subsequently, the details of the control unit 20 and the storage unit 21 will be explained. FIG. 1 is a block diagram illustrating a schematic configuration of the control unit 20 and the storage unit 21 in the digital camera 10. As shown in the figure, the control unit 20 includes a registered person identifying unit (identifying part) 25, an image obtaining unit 30, a face image extracting unit (candidate obtaining part) 31, a similarity degree calculating unit (feature quantity calculating part) 32, an in-class variance calculating unit (in-class variance calculating part) 33, an inter-class variance calculating unit (inter-class variance calculating part) 34, a variance ratio calculating unit (variance ratio calculating part) 35, and a registration determining unit (registration part) 36. The storage unit 21 includes a registered image storage unit 40.

The registered image storage unit 40 stores a registered person ID (discrimination information) for (individually) discriminating each of multiple registered persons and data of the registration face images, which are associated with each other.

The registered person identifying unit 25 is to identify which registered person the captured subject is. More specifically, the registered person identifying unit 25 displays and outputs an inquiry image to the user via the image composing unit 17 and the display unit 13, obtains a response to the inquiry from a user via the operation unit 14, and identifies which registered person the captured subject is. The registered person identifying unit 25 outputs a registered person ID (discrimination information) of the identified registered person (identified registered person) to the similarity degree calculating unit 32.

The image obtaining unit 30 obtains the data of the captured images from the image processing unit 12. When the image obtaining unit 30 obtains the data of the captured image, the image obtaining unit 30 transmits the obtained data of the captured image to the face image extracting unit 31. It should be noted that the image obtaining unit 30 may obtain the data of the captured image via a communication network (not shown), or may obtain the data from the image recording unit 16.

When the face image extracting unit 31 receives the data of the captured image from the image obtaining unit 30, the face image extracting unit 31 extracts the face image included in the captured image. The face image extracting unit 31 transmits the data of the extracted face image to the similarity degree calculating unit 32 as the data of the candidate face image. It should be noted that specific examples of processing according to which the face image extracting unit 31 extracts the face image from the captured image is publicly known. Therefore, description thereabout is omitted. The face image extracting unit 31 may calculate the feature quantity of the face image from the data of the extracted face image.

When the similarity degree calculating unit 32 receives the data of the candidate face image from the face image extracting unit 31, the similarity degree calculating unit 32 further calculates the degree of similarity between the received candidate face image and each registration face image registered to the registered image storage unit 40. The similarity degree calculating unit 32 transmits the calculated degree of similarity to the in-class variance calculating unit 33 and the inter-class variance calculating unit 34.

More specifically, the similarity degree calculating unit 32 performs the following processing for each registered person ID. More specifically, on the basis of the data of the candidate face image from the face image extracting unit 31, the similarity degree calculating unit 32 calculates a feature quantity of the candidate face image, and reads the data of each registration face image corresponding to the registered person ID from the registered image storage unit 40, and on the basis of the data of each registration face image thus read, the similarity degree calculating unit 32 calculates the feature quantity of each registration face image.

Examples of feature quantities include a brightness value, coordinate of each face feature quantity (eye end point, mouth end point, and the like), edge feature quantity, histogram (a histogram of brightness value, a color histogram, and the like), Gabor feature quantity, Haar-like feature quantity, HOG (Histograms of Oriented Gradients), SIFT (Scale-Invariant Feature Transform), SURF (Speeded Up Robust Features), LBP (Local Binary Pattern).

Subsequently, the similarity degree calculating unit 32 calculates the degree of similarity between the calculated feature quantity of the candidate face image and the feature quantity of each registration face image, and transmits the degree of similarity calculated to the inter-class variance calculating unit 34. Examples of the degrees of similarity include a distance (Euclidean distance, Mahalanobis distance, and the like), inner product, and normalized correlation.

The similarity degree calculating unit 32 performs the above processing for each registered person ID. Further, the similarity degree calculating unit 32 calculates the degree of similarity calculated with regard to the registered person ID of the identified registered person received from the registered person identifying unit 25 to the in-class variance calculating unit 33.

Using the above expression (1), the in-class variance calculating unit 33 calculates the in-class variance $\sigma_{Wi}^2$ of the degree of similarity concerning each registration face image of the identified registered person (the i-th class) received from the similarity degree calculating unit 32. The in-class variance calculating unit 33 transmits the calculated in-class variance $\sigma_{Wi}^2$ to the variance ratio calculating unit 35.

On the basis of the degree of similarity between each registration face image and the candidate face image received from the similarity degree calculating unit 32, the inter-class variance calculating unit 34 calculates the inter-class variance $\sigma_B^2$ of the degree of similarity using the above expression (2). The inter-class variance calculating unit 34 transmits the calculated inter-class variance $\sigma_B^2$ to the variance ratio calculating unit 35.

More specifically, the inter-class variance calculating unit 34 calculates the degree of similarity average value $m_i$ and the number of registration face images $n_i$ calculated concerning the registered person ID for each registered person ID (class). The average value m of all the degrees of similarity is also calculated. When these values are substituted into the expression (2), the inter-class variance $\sigma_B^2$ of the degrees of similarity is calculated.

The variance ratio calculating unit 35 uses the in-class variance $\sigma_{Wi}^2$ concerning the identified registered person received from the in-class variance calculating unit 33 and the inter-class variance $\sigma_B^2$ received from the inter-class variance calculating unit 34 to calculate the variance ratio $J_{sigma}$ using the above expression (3). The variance ratio calculating unit 35 transmits the calculated variance ratio $J_{sigma}$ to the registration determining unit 36.

When the registration determining unit 36 receives the variance ratio $J_{sigma}$ from the variance ratio calculating unit 35, the registration determining unit 36 determines whether the data of the candidate face image is to be registered or not on the basis of the received variance ratio $J_{sigma}$. When the registration determining unit 36 determines that the data of the candidate face image is to be registered, the registration determining unit 36 associates the data of the candidate face image with the registered person ID of the identified registered person as the data of the registration face image, and registers them to the registered image storage unit 40, and in addition, a message to that effect is displayed and output via the image composing unit 17 and the display unit 13.

It should be noted that criteria of determination of the registration determining unit 36 include the following.

(a) When the variance ratio $J_{sigma}$ is higher than a certain threshold value, the data are registered.
(b) When the variance ratio $J_{sigma}$ is equal to or less than the certain threshold value, the data are registered.
(c) When the variance ratio $J_{sigma}$ is between the two threshold values, the data are registered.
(d) When the variance ratio $J_{sigma}$ is not between the two threshold values, the data are registered.

In the case of (a), data of a face image similar to the data of the registration face image are registered. In the case of (b), data of a condition different from the data of the candidate face image are registered. In the case of (c) and (d), data of a predetermined condition are registered.

The registration determining unit 36 chooses any one of (a) to (d) in accordance with what kind of data of a face image is to be registered. It should be noted that the threshold value may be manually set, or may be automatically set. For example, the threshold value is automatically set as follows: a preferable threshold value is set by checking, using data of a face image prepared in advance, what kind of threshold value is to be used to determine whether registration is possible or not can improve the accuracy of authentication.

Alternatively, choice of (a) or (b) may be automatically set. For example, this can be done by checking, using data of a face image prepared in advance, which of a larger or smaller variance ratio $J_{sigma}$ can improve the accuracy of authentication, and setting one of them that can improve the accuracy of authentication.

Figure 4:
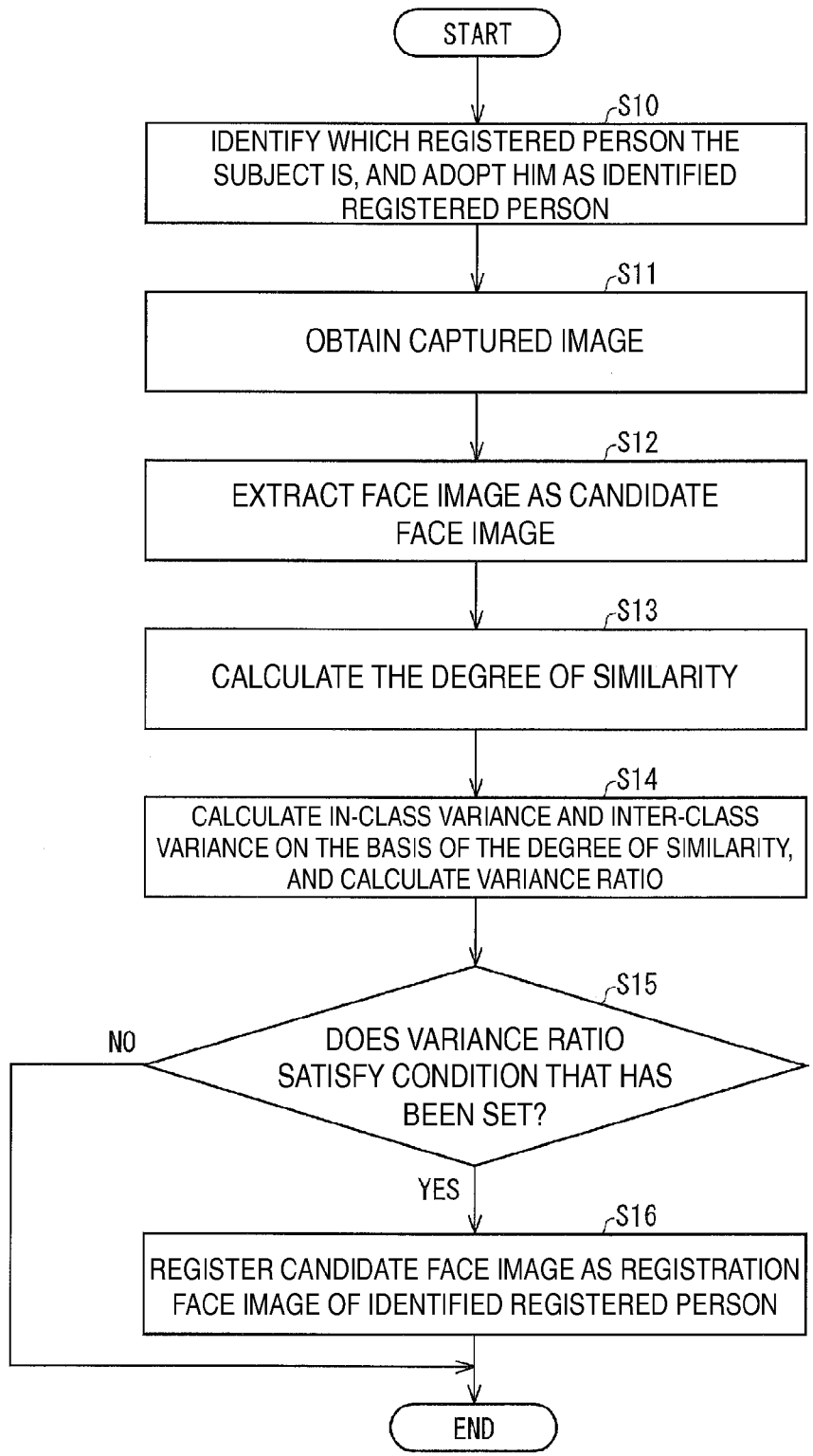
FIG. 4 is a flowchart illustrating a flow of processing performed by the control unit.

Subsequently, processing operation performed by the control unit 20 configured as described above will be explained. FIG. 4 is a flowchart illustrating a flow of processing performed by the control unit 20. As shown in the figure, first, the registered person identifying unit 25 asks the user that which registered person is a subject which is going to be shot and identifies the registered person, and adopts the registered person as an identified registered person (S10, identifying step).

Subsequently, the image obtaining unit 30 obtains the captured image (S11), and the face image extracting unit 31 extracts a face image included in the captured image obtained by the image obtaining unit 30, as a candidate face image (S12, candidate obtaining step). Subsequently, the similarity degree calculating unit 32 calculates, for each registered person, the degree of similarity between the candidate face image extracted by the face image extracting unit 31 and each registration face image registered by the registered image storage unit 40 (S13, feature quantity calculating step).

Subsequently, using the degree of similarity calculated by the similarity degree calculating unit 32, the in-class variance calculating unit 33 calculates the in-class variance $\sigma_{Wi}^2$ concerning the identified registered person (S14, in-class variance calculating step), and the inter-class variance calculating unit 34 calculates the inter-class variance $\sigma_B^2$ (S14, inter-class variance calculating step). Subsequently, variance ratio calculating unit 35 uses the in-class variance $\sigma_{Wi}^2$ concerning the identified registered person calculated by the in-class variance calculating unit 33 and the inter-class variance $\sigma_B^2$ calculated by the inter-class variance calculating unit 34 to calculate the variance ratio $J_{sigma}$ (S14, variance ratio calculating step).

Then, when the variance ratio $J_{sigma}$ calculated by the variance ratio calculating unit 35 satisfies the condition which has been set (YES in S15), the registration determining unit 36 adopts the candidate face image as the registration face image of the identified registered person, and associates the data with the registered person ID of the identified registered person, and registers the data to the registered image storage unit 40 (S16, registration step). Thereafter, the processing is terminated. On the other hand, the variance ratio $J_{sigma}$ does not satisfy the condition which has been set (NO in S15), the processing is terminated without registering the candidate face image.

Second Embodiment

Figure 5:
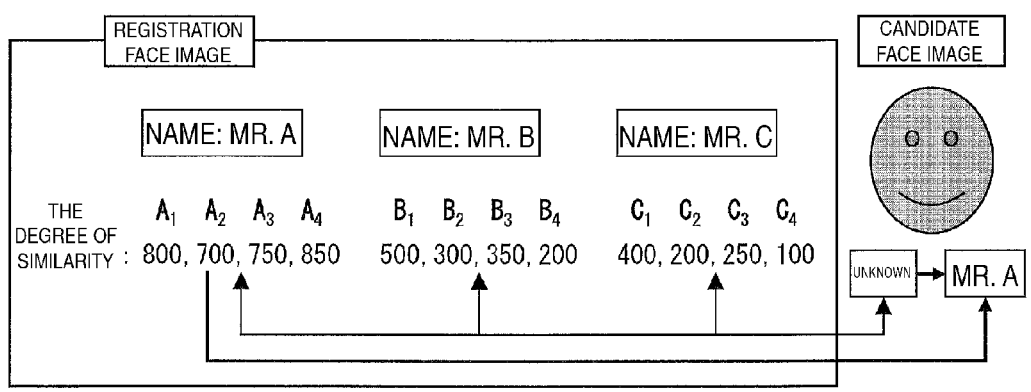
FIG. 5 is a figure illustrating overview of an example of processing in another embodiment of the present invention.

Subsequently, another embodiment of the present invention will be explained with reference to FIGS. 5 to 7. FIG. 5 is a figure illustrating overview of an example of processing according to the present embodiment. As shown in the figure, as compared with the embodiment as shown in FIG. 3, the present embodiment is different in that it is unknown of which registered person a candidate face image extracted from a captured image is. For this reason, in the present embodiment, face recognition (collation) is performed on the basis of the degree of similarity between a candidate face image and each registration face image, thus identifying of which registered person the candidate face image is.

In the example of FIG. 5, among Mr. A, Mr. B, and Mr. C, Mr. A, the one whose maximum value of the degree of similarity is the maximum is identified as a registered person concerning the candidate face image. It should be noted that a registered person whose minimum value of the degree of similarity of each registered person is the maximum may be identified as a registered person concerning the candidate face image.

Figure 6:
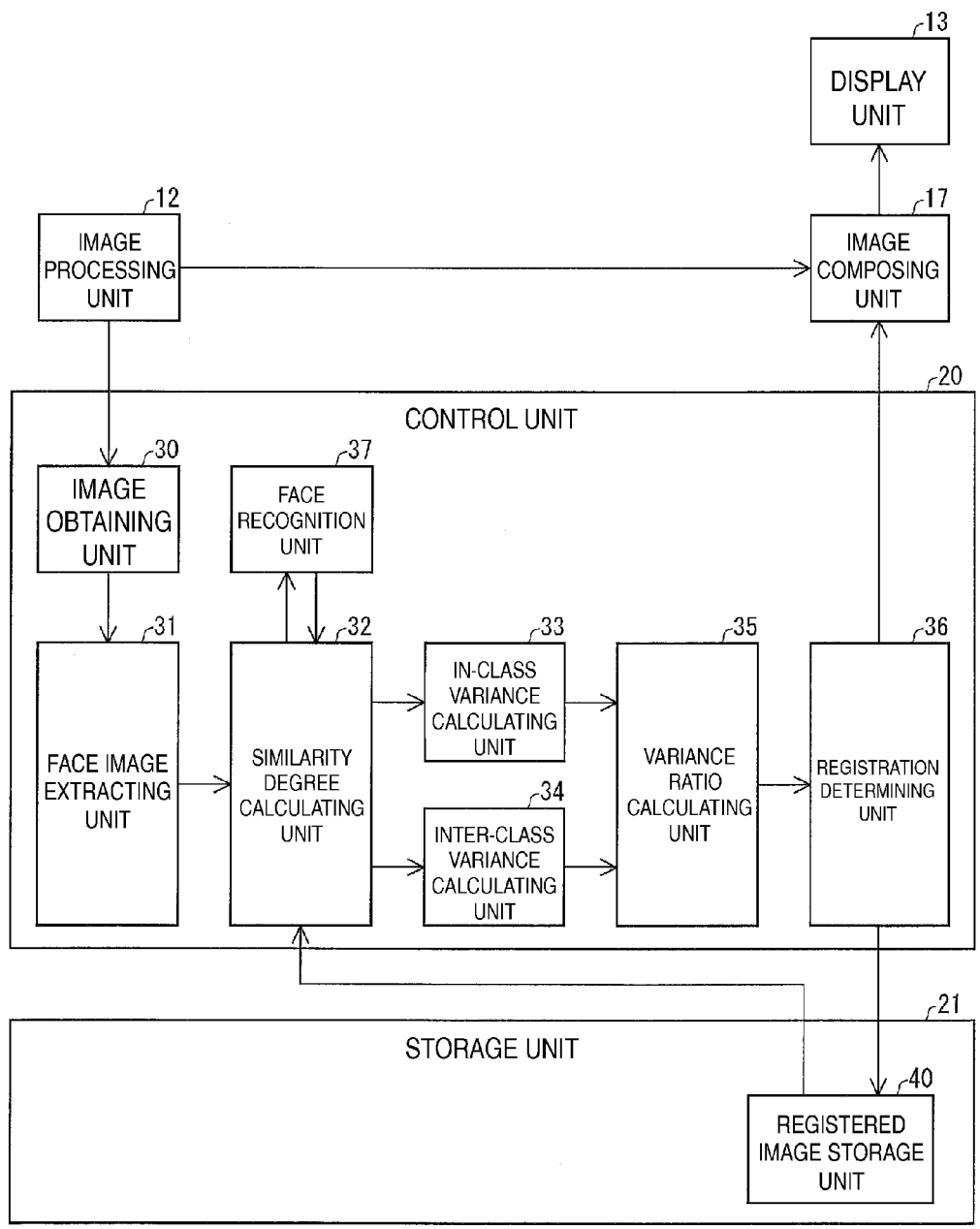
FIG. 6 is a block diagram illustrating a schematic configuration of a control unit and a storage unit in a digital camera according to the above embodiment.

FIG. 6 is a block diagram illustrating a schematic configuration of a control unit 20 and a storage unit 21 in a digital camera 10 which is the present embodiment. As compared with the digital camera 10 as shown in FIGS. 1 to 4, the digital camera 10 of the present embodiment is different in that the control unit 20 is provided with a face recognition unit (identifying part) 37 instead of the registered person identifying unit 25, and the configuration other than this is the same as the digital camera 10. The same configuration and processing operation as the configuration and processing operation explained in the embodiment will be denoted with the same reference numerals, and description thereabout is omitted.

When the face recognition unit 37 receives the degree of similarity from the similarity degree calculating unit 32, the face recognition unit 37 recognizes, on the basis of the degree of similarity received, of which registered person the candidate face image is. The face recognition unit 37 identifies the recognized registered person as an identified registered person, and transmits the registered person ID to the similarity degree calculating unit 32.

More specifically, first, the face recognition unit 37 calculates the average value of the degree of similarity received from the similarity degree calculating unit 32 for each registered person ID. Subsequently, the face recognition unit 37 identifies the registered person ID of which calculated average value is the maximum, and transmits the identified registered person ID to the similarity degree calculating unit 32 as the registered person ID of the identified registered person. Instead of the average value, a statistics value such as a maximum value and an intermediate value may be used.

Figure 7:
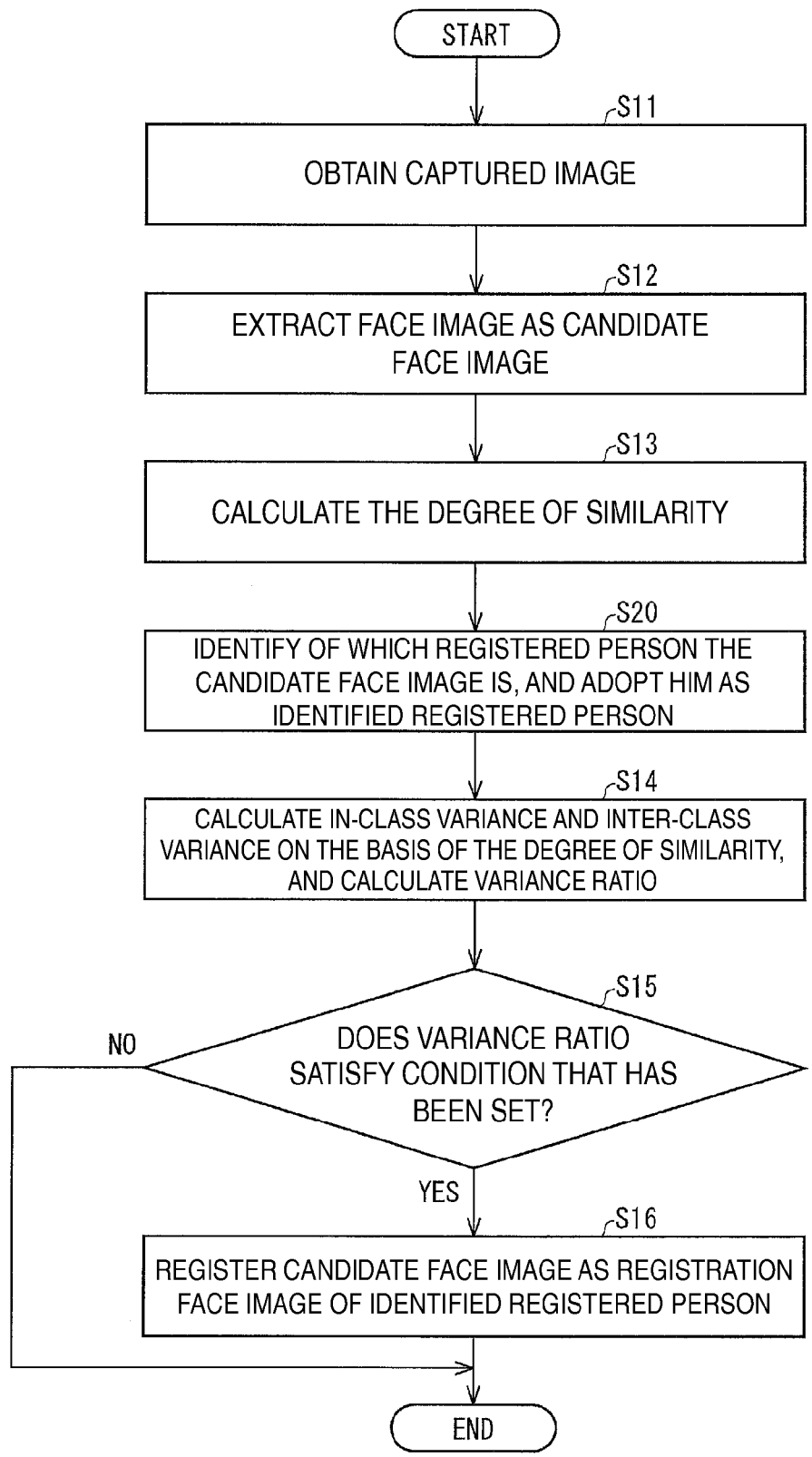
FIG. 7 is a flowchart illustrating a flow of processing performed by the control unit according to the above embodiment.

FIG. 7 is a flowchart illustrating a flow of processing performed by the control unit 20 of the present embodiment. As compared with the processing as shown in FIG. 4, the processing as shown in the figure is different in that, instead of step S10, step S20 is inserted between step S13 and step S14, and the processing other than the above is the same.

In step S20, on the basis of the degree of similarity calculated by the similarity degree calculating unit 32 in step S13, the face recognition unit 37 identifies (recognizes) of which face image of registered person the candidate face image is, and adopts the registered person as the identified registered person (identifying step).

Therefore, even when it is unknown of which face image of registered person the candidate face image extracted from the captured image is, the digital camera 10 of the present embodiment performs the face recognition and can identify the registered person. As a result, it is not necessary for the user to identify the registered person, and this improves the user's convenience.

Third Embodiment

Figure 8:
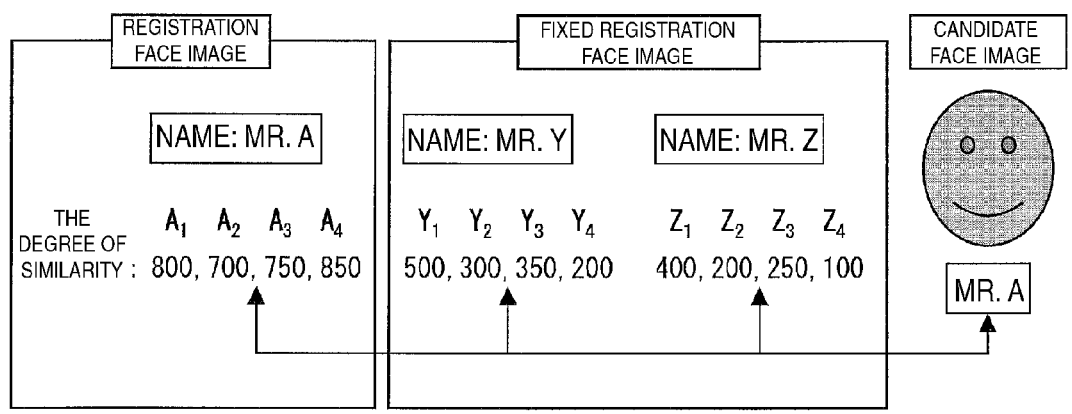
FIG. 8 is a figure illustrating overview of an example of processing in still another embodiment of the present invention.

Subsequently, still another embodiment of the present invention will be explained with reference to FIGS. 8 and 9. FIG. 8 is a figure illustrating overview of an example of processing of the present embodiment. As shown in the figure, as compared with the embodiment as shown in FIG. 3, the present embodiment is different in that, during manufacturing, data of face images of multiple persons are registered in advance in a storage unit 21 as data of registration face images.

Therefore, the persons are fixed registered persons, and the face images are fixed registration face images. In the example of FIG. 8, Mr. Y and Mr. Z are fixed registered persons. Face images $Y_1$ to $Y_4$ of Mr. Y and face images $Z_1$ to $Z_4$ of Mr. Z are fixed registration face images. It should be noted that the fixed registered person and the registration face image may be registered in advance when a manufacturer manufactures and ships the device. Alternatively, a sales agent may register the fixed registered person and the registration face image in advance when the sales agent sells the device. Alternatively, a user may register the fixed registered person and the registration face image in advance before the user registers the face image of the user.

Figure 9:
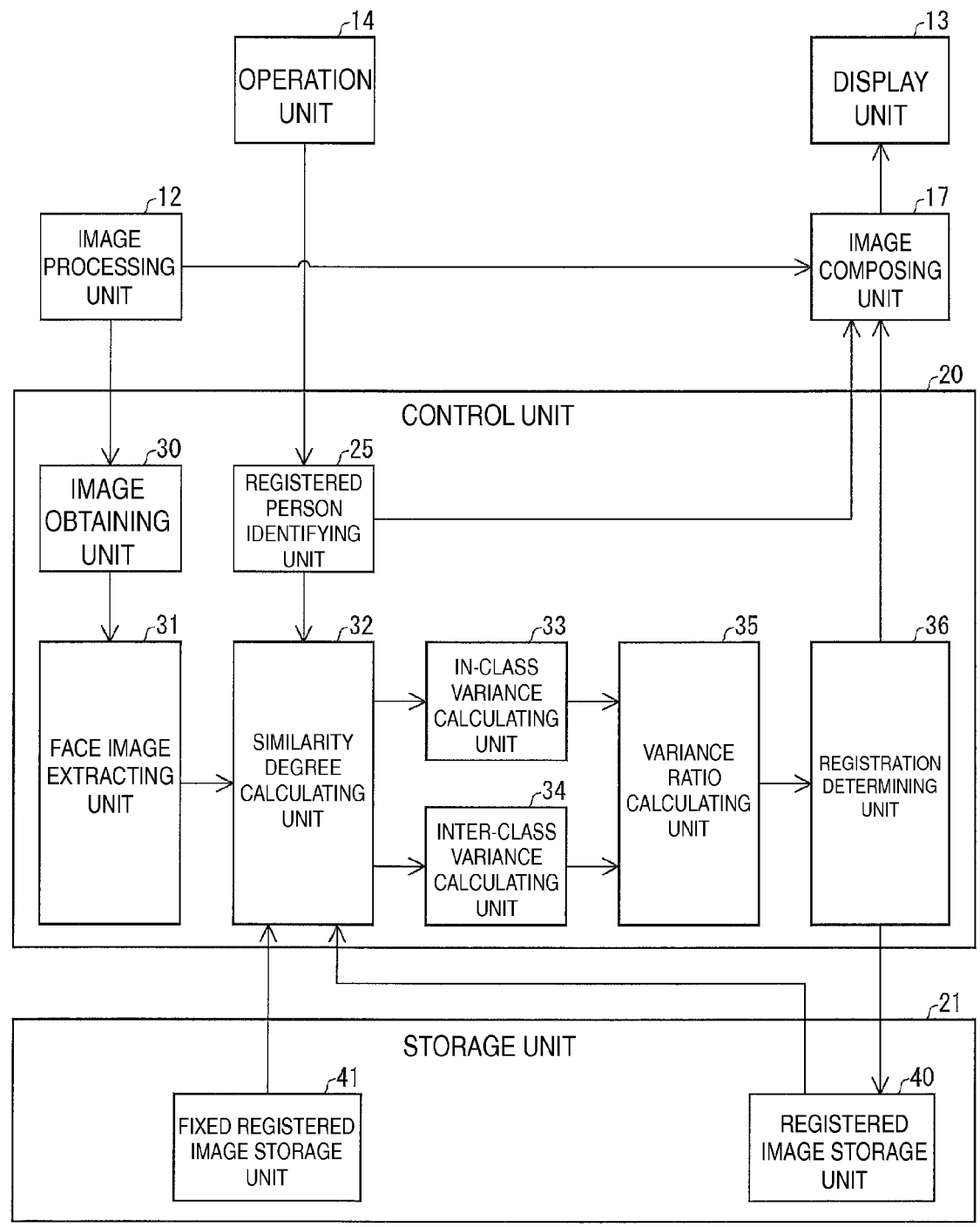
FIG. 9 is a block diagram illustrating a schematic configuration of a control unit and a storage unit in a digital camera according to the above embodiment.

FIG. 9 is a block diagram illustrating a schematic configuration of a control unit 20 and a storage unit 21 in a digital camera 10 which is the present embodiment. As compared with the digital camera 10 as shown in FIGS. 1 to 4, the digital camera 10 of the present embodiment is different in that a fixed registered image storage unit 41 is added to a storage unit 21, and the configuration other than this is the same as the digital camera 10. The same configuration and processing operation as the configuration and processing operation explained in the embodiment will be denoted with the same reference numerals, and description thereabout is omitted.

The fixed registered image storage unit 41 stores a registered person ID for discriminating each of multiple fixed registered persons and data of the fixed registration face images, which are associated with each other. It should be noted that the fixed registration face image may be an actual face image of a person, or may be an average-like face image or a feature quantity generated from face images of many persons, or may be a face image or a feature quantity generated according to other methods, or may be a combination thereof. The fixed registered image storage unit 41 need not store new data of a registration face image. Therefore, the fixed registered image storage unit 41 may be made of a ROM.

The fixed registered person ID and the data of the registration face image stored in the fixed registered image storage unit 41 are used by the similarity degree calculating unit 32. More specifically, the similarity degree calculating unit 32 calculates the degree of similarity between a candidate face image received from the face image extracting unit 31 and each registration face image registered in the registered image storage unit 40, and calculates the degree of similarity between the candidate face image and each fixed registration face image registered in the fixed registered image storage unit 41.

It should be noted that the processing performed by the control unit 20 of the present embodiment is the same as the processing as shown in FIG. 4, and therefore description thereabout is omitted.

Therefore, in the digital camera 10 of the present embodiment, even when only one registered person (Mr. A) is registered, the registration face images of the fixed registered persons (Mr. Y/Mr. Z) are used, so that the degrees of similarity of the other registered persons can be calculated, and a inter-class variance can be calculated. Therefore, whether a candidate face image can be registered or not can be determined.

In the present embodiment, when there is only one piece of data of a registration face image of a registered person, there is only one piece of the degree of similarity between the candidate face image and the registration face image of the registered person, and therefore, the in-class variance $\sigma_{Wi}^2$ of the degree of similarity concerning the registered person is zero.

Accordingly, a default value (fixed value) of the in-class variance may be stored to the storage unit 21 in advance, and when only one piece of data of a registration face image of an identified registered person is stored in the registered image storage unit 40, the in-class variance calculating unit 33 may transmit a default value to the variance ratio calculating unit 35 as a value of the in-class variance. Accordingly, even in the above case, the variance ratio $J_{sigma}$ can be calculated, and whether the candidate face image can be registered or not can be determined.

The default value of the in-class variance may be an empirical value and a value of the in-class variance obtained from a fixed registration face image. The default value may be used when several pieces (a few pieces such as two or three pieces) of data of registration face images of the identified registered persons are registered in the registered image storage unit 40.

Fourth Embodiment

Figure 10:
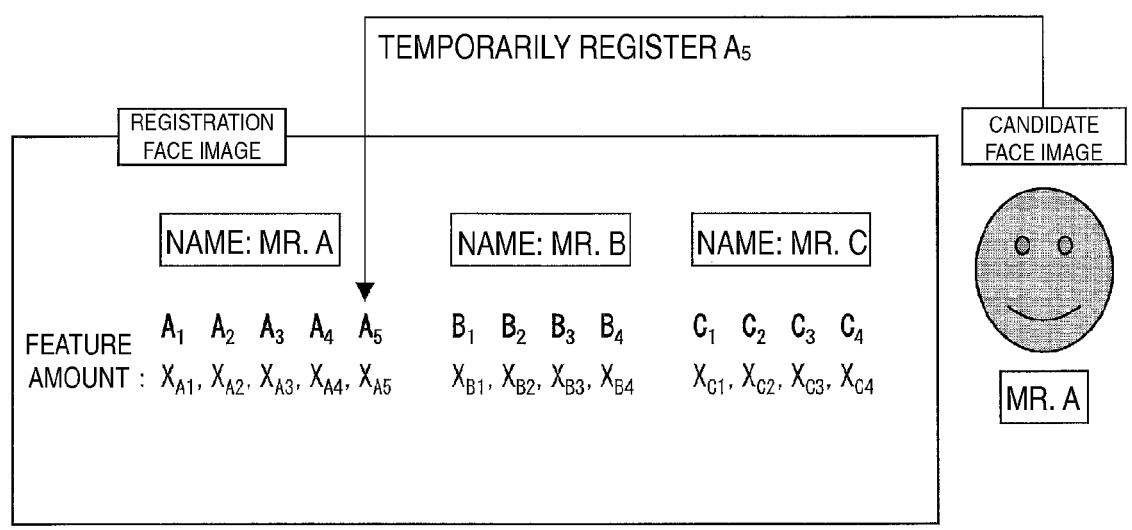
FIG. 10 is a figure illustrating overview of an example of processing in still another embodiment of the present invention.

Subsequently, still another embodiment of the present invention will be explained with reference to FIGS. 10 to 12. FIG. 10 is a figure illustrating overview of an example of processing of the present embodiment. As shown in the figure, as compared with the embodiment as shown in FIG. 3, the present embodiment is different in that a candidate face image is temporarily registered in a registration face image of an identified registered person. In the example of FIG. 10, a candidate face image of Mr. A is temporarily registered as a registration face image A5 of Mr. A.

As compared with the embodiment as shown in FIG. 3, the present embodiment is different in that, instead of the degree of similarity between a candidate face image and a registration face image, a variance value is obtained from a feature quantity of the candidate face image and a feature quantity of the registration face image. Therefore, in the present embodiment, an in-class variance $\sigma_{Wi}^2$ of a feature quantity concerning the identified registered person is calculated from the above expression (1), and an inter-class variance $\sigma_B^2$ of feature quantities of all registered persons are calculated from the above expression (2). It should be noted that the feature quantity may be a scalar which is one-dimensional feature quantity or may be a vector which is a multi-dimensional feature quantity.

Subsequently, a variance ratio $J_{sigma}$ is calculated using the above expression (3). The variance ratio $J_{sigma}$ is a ratio of the calculated inter-class variance $\sigma_B^2$ with respect to the calculated in-class variance $\sigma_{Wi}^2$ within the class. Then, a determination is made as to whether the temporary registration face image (candidate face image) is to be registered or not on the basis of the calculated variance ratio $J_{sigma}$ and a criterion that has been set. When the temporary registration face image is determined to be registered, the data of the temporary registration face image are registered to the storage unit 21 as the data of the registration face image of the identified registered person.

Figure 11:
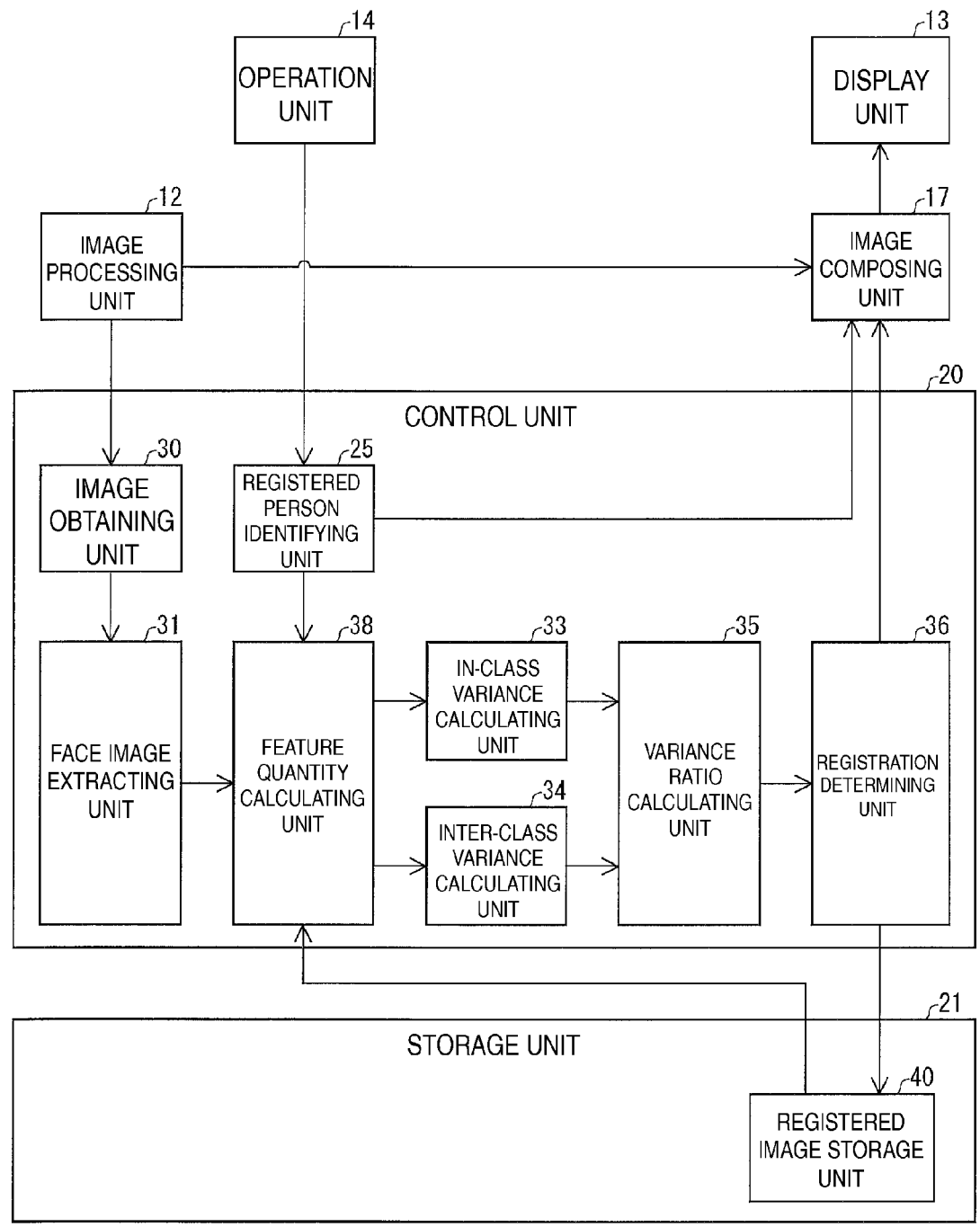
FIG. 11 is a block diagram illustrating a schematic configuration of a control unit and a storage unit in a digital camera according to the above embodiment.

FIG. 11 is a block diagram illustrating a schematic configuration of a control unit 20 and a storage unit 21 in a digital camera 10 which is the present embodiment. As compared with the digital camera 10 as shown in FIGS. 1 to 4, the digital camera 10 of the present embodiment is different in that the control unit 20 is provided with a feature quantity calculating unit (feature quantity calculating part) 38 instead of the similarity degree calculating unit 32, and the configuration other than this is the same as the digital camera 10. The same configuration and processing operation as the configuration and processing operation explained in the embodiment will be denoted with the same reference numerals, and description thereabout is omitted.

When the feature quantity calculating unit 38 receives the data of the candidate face image from the face image extracting unit 31, the feature quantity calculating unit 38 calculates a feature quantity of the received candidate face image, and respectively calculates feature quantities of multiple registration face images registered in the registered image storage unit 40. The feature quantity calculating unit 38 transmits the calculated feature quantity to the in-class variance calculating unit 33 and the inter-class variance calculating unit 34.

More specifically, the feature quantity calculating unit 38 performs the following processing for the registered person ID of the identified registered person received from the registered person identifying unit 25. More specifically, the feature quantity calculating unit 38 reads each piece of data of a registration face image corresponding to a registered person ID of an identified registered person from the registered image storage unit 40, and calculates the feature quantity of each registration face image on the basis of each piece of the data of the registration face image that have been read. Subsequently, the feature quantity calculating unit 38 calculates the feature quantity of the candidate face image on the basis of the data of the candidate face image given by the face image extracting unit 31.

Then, the feature quantity calculating unit 38 transmits the feature quantity of each registration face image and the feature quantity of the candidate face image which have been calculated to the in-class variance calculating unit 33 and the inter-class variance calculating unit 34 as the feature quantities concerning the registered person ID of the identified registered person. Accordingly, the candidate face image is processed in the same manner as the registration face image corresponding to the registered person ID of the identified registered person as if it is temporarily registered in the registered image storage unit 40.

Subsequently, the following processing is performed for the registered person ID (class) of each registered person other than the identified registered persons. More specifically, the feature quantity calculating unit 38 reads each piece of data of a registration face image corresponding to a registered person ID from the registered image storage unit 40, and calculates the feature quantity of each registration face image on the basis of each piece of the data of the registration face image that have been read. Then, the feature quantity calculating unit 38 transmits the feature quantity of each registration face image calculated to the inter-class variance calculating unit 34 as the feature quantities concerning the registered person ID.

Figure 12:
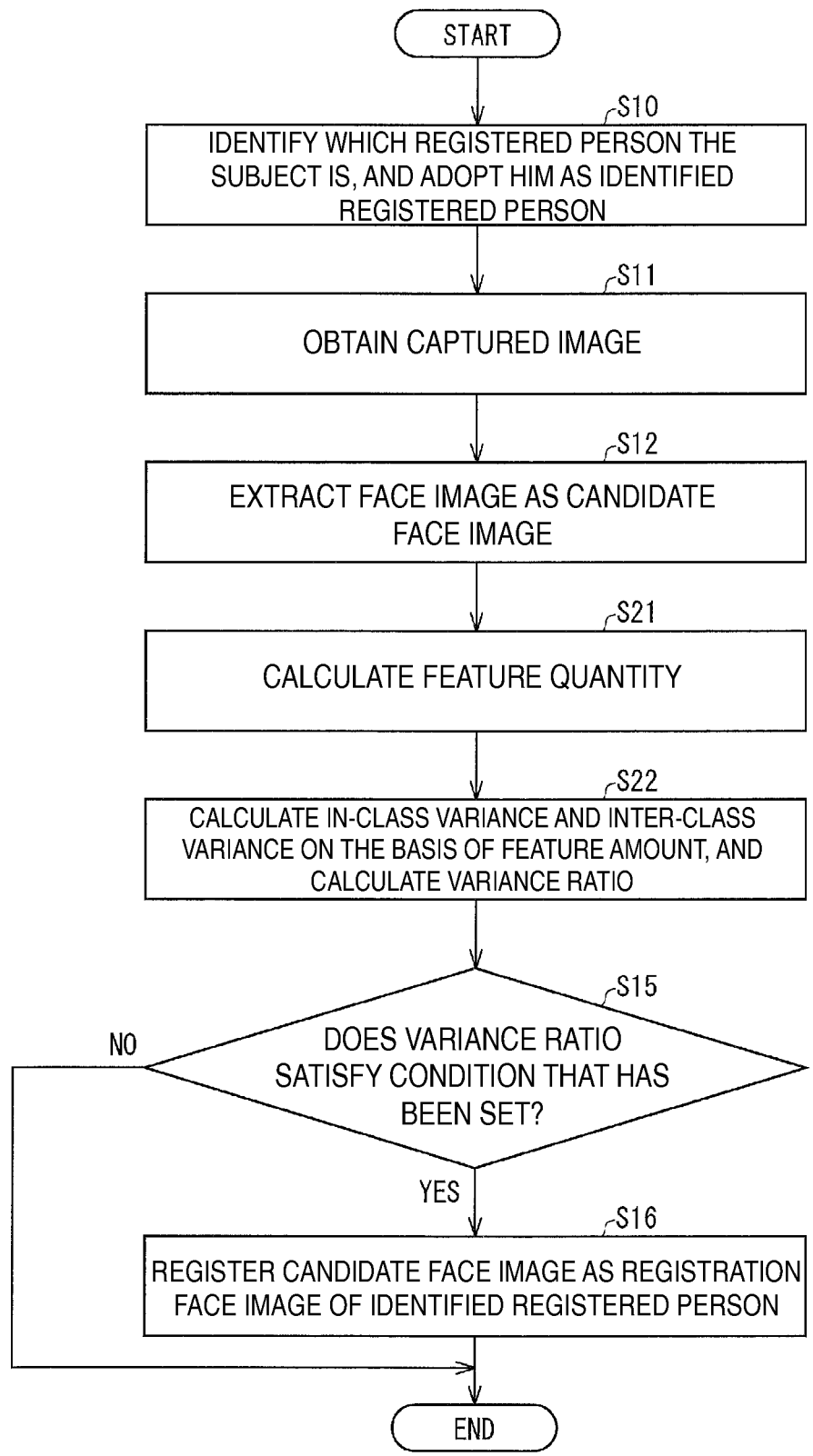
FIG. 12 is a flowchart illustrating a flow of processing performed by the control unit.

FIG. 12 is a flowchart illustrating a flow of processing performed by the control unit 20 of the present embodiment. As compared with the processing as shown in FIG. 4, the processing shown in the figure is different in that steps S21/S22 are provided instead of steps S13/S14, and processing other than the above is the same.

In step S21, the feature quantity calculating unit 38 calculates the feature quantity of the candidate face image of the identified registered person extracted by the face image extracting unit 31, and calculates, for each registered person the feature quantity of each registration face image registered in the registered image storage unit 40 (feature quantity calculating step).

In step S22, using the feature quantity of each registration face image and the feature quantity of the candidate face image calculated by the feature quantity calculating unit 38 concerning the identified registered person, the in-class variance calculating unit 33 calculates the in-class variance $\sigma_W^2$ concerning the identified registered person (in-class variance calculating step). On the other hand, using the feature quantities of each registration face image and the candidate face image concerning the identified registered person and the feature quantity of a registration face image calculated by the feature quantity calculating unit 38 for each of the other registered persons, the inter-class variance calculating unit 34 calculates the inter-class variance $\sigma_B^2$ (inter-class variance calculating step). Subsequently, using the in-class variance $\sigma_W^2$ concerning the identified registered person calculated by the in-class variance calculating unit 33 and the inter-class variance $\sigma_B^2$ calculated by the inter-class variance calculating unit 34, the variance ratio calculating unit 35 calculates the variance ratio $J_{sigma}$ (variance ratio calculating step).

Therefore, the digital camera 10 of the present embodiment calculates the variance ratio concerning the feature quantity when the candidate face image is temporarily registered, and determines whether registration is possible or not on the basis of the calculated variance ratio. As a result, whether registration is possible or not can be determined in view of the candidate face image.

In the present embodiment, like the embodiments as shown in FIGS. 8 and 9, the feature quantity calculating unit 38 may calculate the feature quantity concerning the fixed registered person, using the data of the fixed registration face image stored in the fixed registered image storage unit 41. In this case, even when there is only one registered person, the inter-class variance of the feature quantity can be calculated using the registration face image of the fixed registered person. Therefore, whether a candidate face image can be registered or not can be determined.

In the data of the fixed registration face image, only the feature quantity of the fixed registered person is used in the inter-class variance calculating unit 34. Therefore, a modification as shown in FIG. 13 may be considered.

Figure 13:
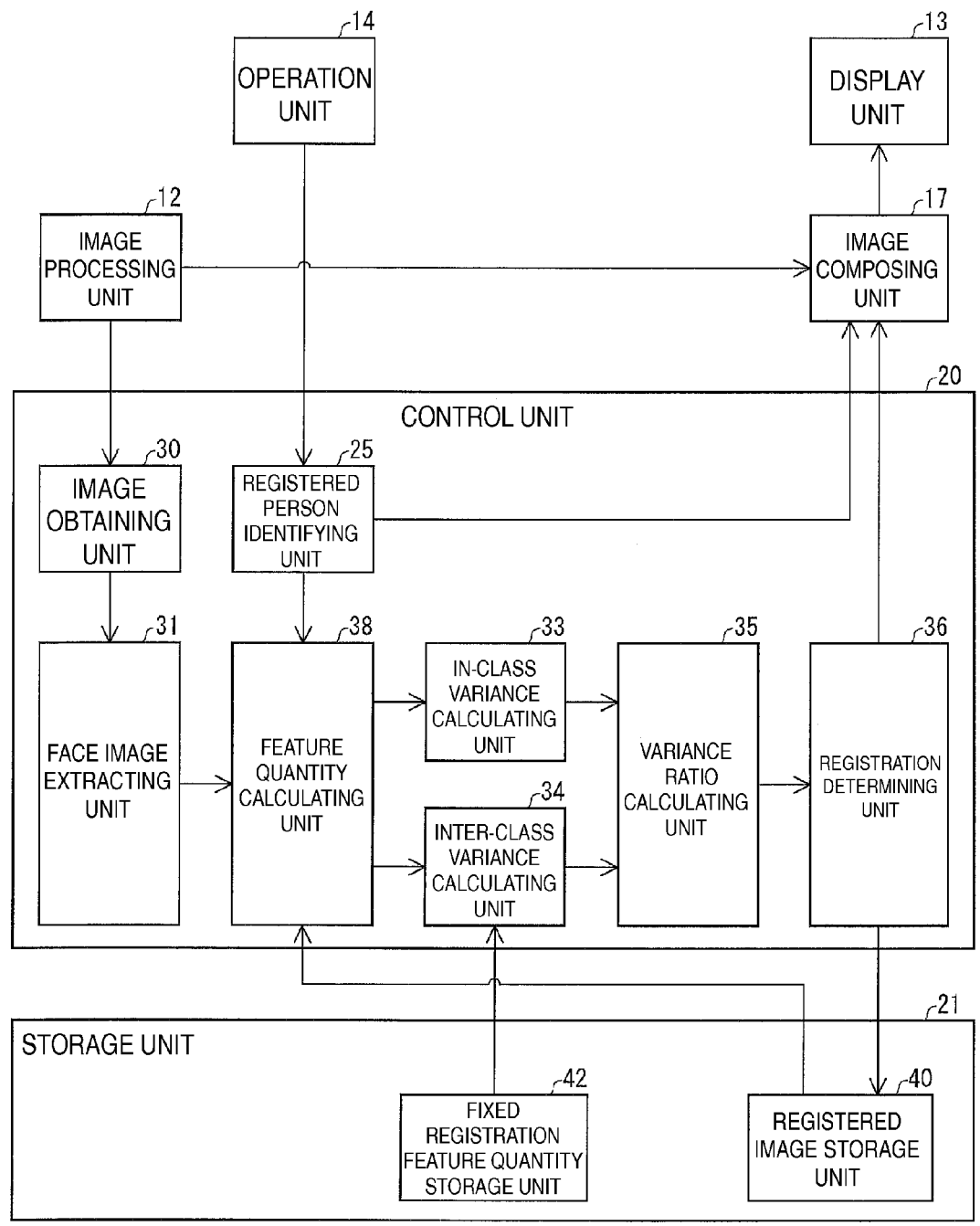
FIG. 13 is a block diagram illustrating a schematic configuration of a control unit and a storage unit according to a modification of the above embodiment.

FIG. 13 is a block diagram illustrating a schematic configuration of a control unit 20 and a storage unit 21 according to the modification. As compared with the configuration as shown in FIG. 11, the modification as shown in the figure is different in that the storage unit 21 is provided with a fixed registration feature quantity storage unit 42 in which a fixed feature quantity concerning a fixed registered person is registered, and the configuration other than this is the same.

In a case of an example of modification as shown in FIG. 13, the inter-class variance calculating unit 34 may calculate the inter-class variance $\sigma_B^2$, using the feature quantity of each registration face image and the candidate face image calculated by the feature quantity calculating unit 38 concerning the identified registered person and the fixed feature quantity concerning the fixed registered person stored in the fixed registered image storage unit 41. According to the modification as shown in the figure, the feature quantity calculating unit 38 need not calculate the feature quantity concerning registered persons other than the identified registered persons, and the processing can be performed quickly.

In the present embodiment, when the data of a registration face image of a certain person are not registered, there is only one feature quantity of the candidate face image of that person. Therefore, the in-class variance $\sigma_W^2$ is zero.

Accordingly, a default value (fixed value) of the in-class variance may be stored to the storage unit 21 in advance, and when the data of a registration face image of an identified registered person are not stored in the registered image storage unit 40, the in-class variance calculating unit 33 may transmit a default value to the variance ratio calculating unit 35 as a value of the in-class variance. Accordingly, the variance ratio $J_{sigma}$ can be calculated even for a non-registered person, and whether the candidate face image can be registered or not can be determined.

Fifth Embodiment

Figure 14:
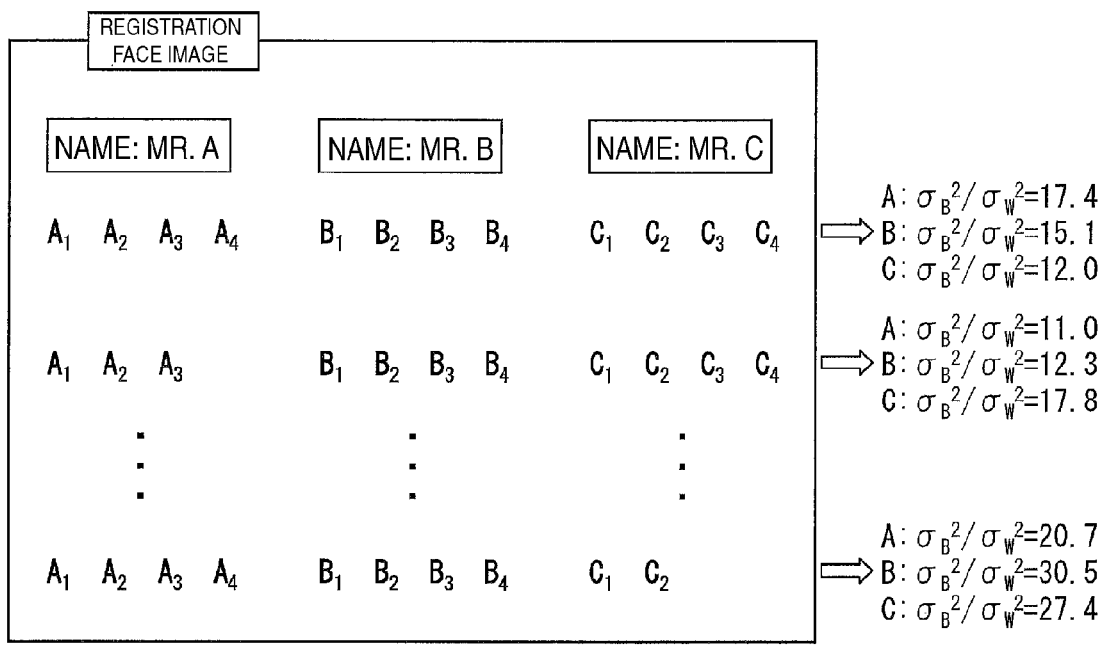
FIG. 14 is a figure illustrating overview of an example of processing in still another embodiment of the present invention.

Subsequently, another embodiment of the present invention will be explained with reference to FIGS. 14 to 16. FIG. 14 is a figure illustrating overview of an example of processing according to the present embodiment. As shown in the figure, the present embodiment is to execute maintenance of a registration face image as shown in FIG. 3.

As shown in FIG. 14, first, a combination of registration face images including at least two registration face images for each registered person is generated. In the example as shown in the figure, 1331 combinations are generated (($(2^4-(1+4))^3=1331$).

Subsequently, for a certain combination, the feature quantities of the registration face images are calculated, and on the basis of the calculated feature quantities, the in-class variance $\sigma_W^2$ and the inter-class variance $\sigma_B^2$ of each registered person are calculated, and a variance ratio of each registered person is calculated. Then, this is repeated on all the combinations.

Subsequently, a combination of which variance ratio is the maximum or the minimum is selected, and the registered image storage unit 40 is updated with the data of the registration face images in the selected combination. More specifically, the data of the registration face images other than the registration face images of the selected combination are deleted from the registered image storage unit 40. Therefore, the data of the registration face images which need not be registered can be deleted from the registered image storage unit 40, and this can avoid waste of resources. In addition, an optimum combination can be generated, which can improve the accuracy of the authentication.

When a combination of which variance ratio is the maximum is selected, registration face images of the same person are similar, and therefore, although the score (the degree of similarity) is low when the condition is different, it is less likely to falsely determine it as another person. On the other hand, when a combination of which variance ratio is the minimum is selected, registration face images of the same person are different in various manners, and therefore, although the score is high when the condition is different, it is more likely to falsely determine it as another person. Choosing any one of them is dependent upon what kind of face recognition is desired.

In the example of FIG. 14, a combination having the maximum variance ratio $J_{sigma}$=30.5 (A1 to A4/B1 to B4/C1/C2) is selected, and the registered image storage unit 40 is updated with the selected data of the registration face image. More specifically, the data of the registration face images C3/C4 are deleted from the registered image storage unit 40.

Figure 15:
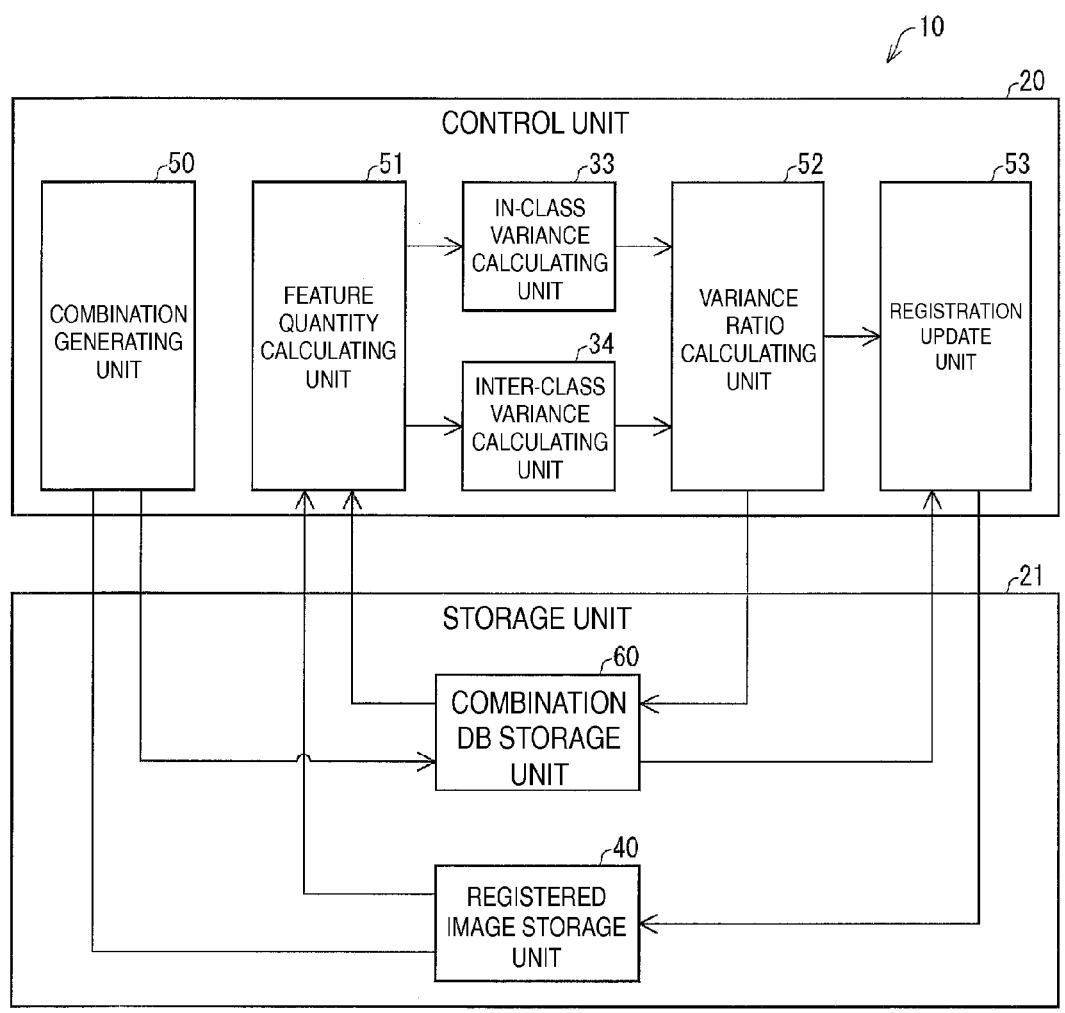
FIG. 15 is a block diagram illustrating a schematic configuration of a control unit and a storage unit in a digital camera according to the above embodiment.

FIG. 15 is a block diagram illustrating a schematic configuration of a control unit 20 and a storage unit 21 in a digital camera 10 which is the present embodiment. As compared with the digital camera 10 as shown in FIGS. 1 to 4, the digital camera 10 of the present embodiment is different in the following features, and the configuration other than this is the same as the digital camera 10. The same configuration and processing operation as the configuration and processing operation explained in the embodiment will be denoted with the same reference numerals, and description thereabout is omitted.

More specifically, the control unit 20 does not have the registered person identifying unit 25, the image obtaining unit 30, and the face image extracting unit 31. Instead of the similarity degree calculating unit 32, the variance ratio calculating unit 35, and the registration determining unit 36, the control unit 20 is provided with a feature quantity calculating unit (feature quantity calculating part) 51, a variance ratio calculating unit 52, and a registration update unit (registration update part) 53, and a combination generating unit (combination generating part) 50 is additionally provided. In addition, the storage unit 21 additionally includes a combination DB (database) storage unit 60.

For each combination, the combination DB storage unit 60 includes information about the registration face image and the variance ratio.

The combination generating unit 50 generates a combination including at least two registration face images for each registered person from all the registration face images stored in the registered image storage unit 40. The combination generating unit 50 stores the generated information about the combination to the combination DB storage unit 60.

For each combination stored in the combination DB storage unit 60, the feature quantity calculating unit 51 reads the registration face image included in the combination from the registered image storage unit 40, and calculates the feature quantity. The feature quantity calculating unit 51 transmits the calculated feature quantity to the in-class variance calculating unit 33 and the inter-class variance calculating unit 34 for each registered person ID.

The variance ratio calculating unit 52 calculates the variance ratio $J_{sigma}$ of each registered person, on the basis of the in-class variance $\sigma_{Wi}^2$ of each registered person received from the in-class variance calculating unit 33 and the inter-class variance $\sigma_B^2$ received from the inter-class variance calculating unit 34. The variance ratio calculating unit 52 stores, to the combination DB storage unit 60, the variance ratio $J_{sigma}$ of each registered person in each of the calculated combinations.

For each combination, the registration update unit 53 reads the variance ratio $J_{sigma}$ of each registered person stored in the combination DB storage unit 60, selects a combination of the variance ratio $J_{sigma}$ satisfying the condition that has been set, and updates the registered image storage unit 40 with the data of the registration face images included in the selected combination.

Figure 16:
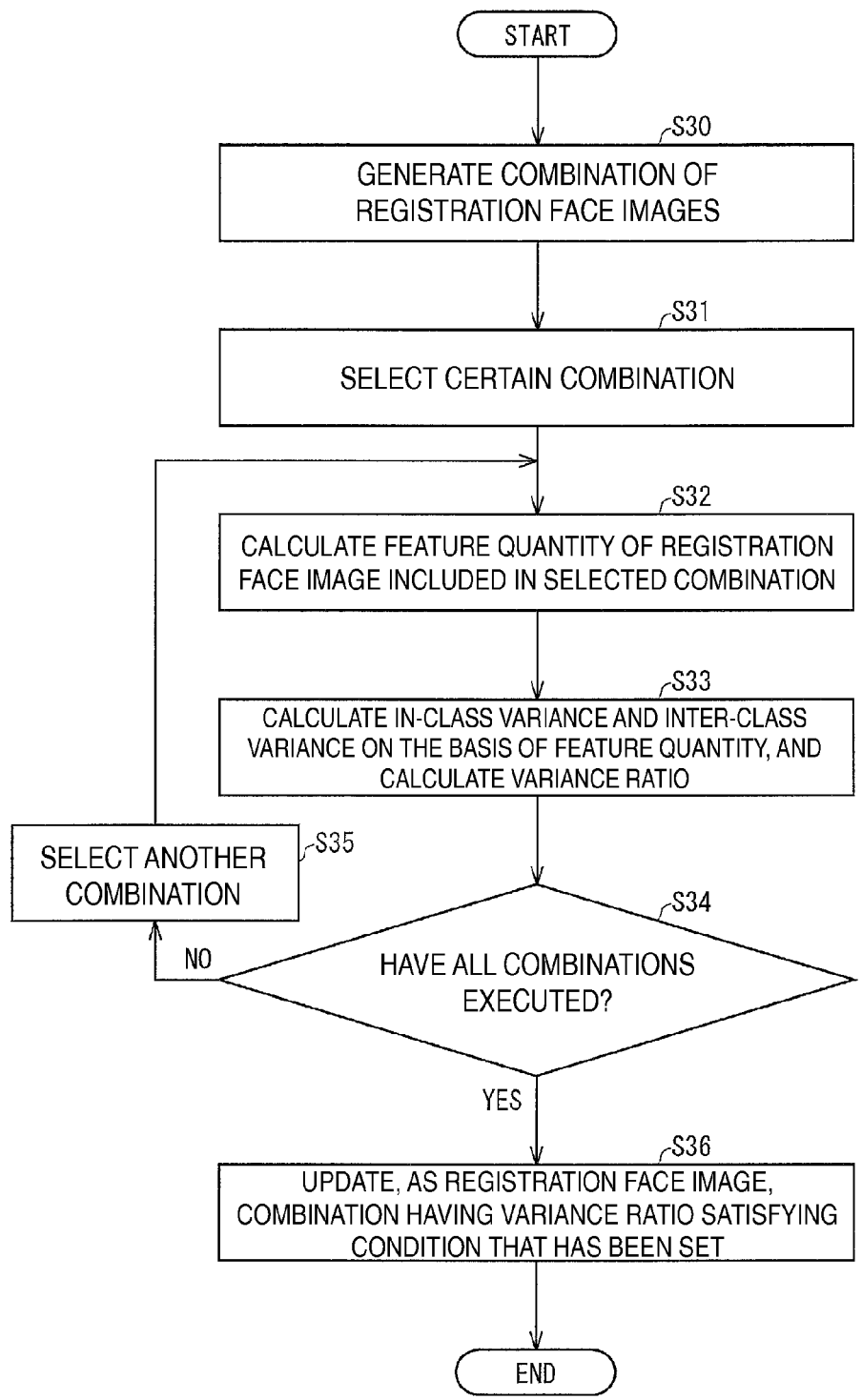
FIG. 16 is a flowchart illustrating a flow of processing of the control unit.

FIG. 16 is a flowchart illustrating a flow of processing performed by the control unit 20 of the present embodiment. As shown in the figure, first, the combination generating unit 50 generates a combination including at least two registration face images for each registered person from all the registration face images stored in the registered image storage unit 40 (S30).

Subsequently, the feature quantity calculating unit 51 selects a certain combination, and calculates the feature quantity of the registration face image included in the selected combination (S32). Subsequently, on the basis of the calculated feature quantity, the in-class variance calculating unit 33 and the inter-class variance calculating unit 34 calculates the in-class variance $\sigma_{Wi}^2$ and the inter-class variance $\sigma_B^2$, respectively, and the variance ratio calculating unit 52 calculates the variance ratio $J_{sigma}$ of each registered person, and stores the variance ratio $J_{sigma}$ to the combination DB storage unit 60 (S33).

Subsequently, a determination is made as to whether all the combinations have been executed (S34). When all the combinations are determined not to have been executed, the feature quantity calculating unit 51 selects another combination (S35), and returns back to step S32 to repeat the operation. When all the combinations are determined to have been executed, the registration update unit 53 updates the registered image storage unit 40 with the data of the registration face image included in the combination being the variance ratio $J_{sigma}$ satisfying the condition that has been set (S36). Thereafter, the processing is terminated.

The present invention is not limited to each embodiment explained above. The present invention can be changed in various manners within the scope described in claims. The technical scope of the present invention also includes embodiments obtained by appropriately combining technical means disclosed in each of the different embodiments.

For example, in the embodiment, a face image of a person is detected and recognized from a captured image. Alternatively, an image of the upper half of the body of a person or the whole body of a person may be detected, or an image of other objects such as a ball or a vehicle may be detected. More specifically, the present invention can be applied to detection of any given target image included in an obtained captured image.

In the embodiment, the present invention is applied to the digital camera 10. Alternatively, the present invention is applied to any electronic apparatus having an image capturing unit such as a cellular phone, a smart phone, and a PDA (Personal Digital Assistant).

In the embodiment, the registered image storage unit 40 stores image data of registration face images as the registration information. Instead of the image data or together with the image data, data of feature quantities calculated from the registration face images may be stored. In this case, the control unit 20 may not calculate the feature quantity of any registration face image.

Finally, in the digital camera 10, each block, i.e., in particular, the control unit 20, may be constituted by either hardware logic or may be achieved with software using a CPU as explained below.

More specifically, the digital camera 10 includes a CPU executing commands of a control program achieving each function and a storage device (recording medium) such as a memory storing the program and various kinds of data such as a ROM storing the program and a RAM in which the program is extracted. Further, an object of the present invention can also be achieved by providing the digital camera 10 with a recording medium which records program codes of the control program of the digital camera 10 which is software achieving the above functions (execution format program, intermediate code program, source program) in a computer-readable manner, and by causing the computer (or a CPU or an MPU) to read and execute the program codes recorded in the recording medium.

Examples of recording media include a tape system such as a magnetic tape and a cassette tape, a disk system including a magnetic disk such as a floppy (registered trademark) disk/a hard disk and an optical disk such as CD-ROM/MO/MD/DVD/CD-R, a card system such as an IC card (including a memory card)/an optical card, and a semiconductor memory system such as a mask ROM/EPROM/EEPROM/flash ROM.

Alternatively, the digital camera 10 may be configured to be able to connect to a communication network, and the program codes may be provided via the communication network. This communication network is not particularly limited. For example, the Internet, an intranet, an extranet, LAN, ISDN, VAN, CATV communication network, virtual private network, telephone network, mobile communication network, satellite communication network, and the like can be used as the communication network. A transmission medium constituting the communication network is not particularly limited. For example, the transmission medium may be a wired medium such as IEEE1394, USB, Power Line Communications, cable TV network, telephone line, and ADSL line. Alternatively, the transmission medium may be achieved wirelessly using, e.g., infrared communication such as IrDA and a remote controller, Bluetooth (registered trademark), 802.11 wireless network, HDR, cellular phone network, satellite circuit, digital terrestrial network, and the like.

As described above, the registration determination device according to the present invention appropriately determines whether a candidate image is to be registered in view of relationship with a registered image of the same target as the candidate image and relationship with a registered image of a different target from the candidate image, and therefore, the registration determination device according to the present invention can be applied to not only face recognition but also any recognition device recognizing a target from a captured image such as a finger print recognition.

What is claimed is:

1. A registration determination device for determining whether to register a candidate image which is a registration candidate of a target image, as a registered image that is registered in advance in order to perform image recognition of a target, the registration determination device comprising:
   a storage unit configured to store registration information that is at least one of a feature quantity and image data of the registered images in association with discrimination information for discriminating the target;
   a candidate obtaining part configured to obtain the candidate image;
   an identifying part configured to indentify discrimination information corresponding to the candidate image obtained by the candidate obtaining part;
   a feature quantity calculating part configured to calculate a feature quantity of the candidate image obtained by the candidate obtaining part;
   an in-class variance calculating part configured to calculate, with regard to the candidate image and a registered image in a same class corresponding to the discrimination information identified by the identifying part, an in-class variance of a feature quantity of the candidate image calculated by the feature quantity calculating part and a feature quantity based on the registration information of the registered image, or an in-class variance of a degree of similarity between the feature quantity of the candidate image and the feature quantity of the registered image;
   an inter-class variance calculating part configured to calculate, with regard to registered images in a plurality of classes respectively corresponding to a plurality of pieces of discrimination information, an inter-class variance of the feature quantity of the candidate image and feature quantities of the registered images based on the registration information of the registered images or the inter-class variance of the degree of similarity between the feature quantity of the candidate image and the feature quantities of the registered images;
   a variance ratio calculating part configured to calculate a variance ratio which is a ratio between the in-class variance calculated by the in-class variance calculating part and the inter-class variance calculated by the inter-class variance calculating part; and
   a registration part, wherein when the calculated variance ratio calculated by the variance ratio calculating part satisfies a preset condition, the registration part registers the candidate image as the registered image to the storage unit in such a manner that the registration information of the registered image is associated with the discrimination information identified by the identifying part.

2. The registration determination device according to claim 1 further comprising an operation unit configured to receive operation from a user, wherein the identifying part identifies the discrimination information corresponding to the candidate image on the basis of operation received from the user via the operation unit.

3. The registration determination device according to claim 1, wherein the identifying part identifies the discrimination information corresponding to the candidate image by collating the candidate image obtained by the candidate obtaining part and the registered images stored in the storage unit.

4. The registration determination device according to claim 1, wherein the storage unit stores the registered images in association with the discrimination information in advance.

5. The registration determination device according to claim 1, wherein when there are one registered image or a few registered images associated with the discrimination information corresponding to the candidate image, the in-class variance calculating part uses a default in-class variance instead of calculating the in-class variance.

6. The registration determination device according to claim 1, wherein the in-class variance calculating part calculates, with regard to the candidate image and the registered image in a same class corresponding to the discrimination information identified by the identifying part, an in-class variance of a feature quantity of the candidate image calculated by the feature quantity calculating part and a feature quantity based on the registration information of the registered image, and the inter-class variance calculating part calculates an inter-class variance of a feature quantity with regard to the candidate image and the registered image in the same class corresponding to the discrimination information identified by the identifying part and a registered image in another class corresponding to other discrimination information.

7. The registration determination device according to claim 1 further comprising:
   a combination generating part configured to generate a combination including at least two registered images in each class with regard to the registered images in the plurality of classes respectively corresponding to the plurality of pieces of discrimination information; and
   a registration update part using the in-class variance calculating part, the inter-class variance calculating part, and the variance ratio calculating part to update the registration information of the registered images in the storage unit with registration information of a registered image of a combination satisfying a preset condition, among the variance ratios between the in-class variance and the inter-class variance corresponding to each class, which are calculated for each combination generated by the combination generating part.

8. An electronic apparatus comprising a registration determination device according to claim 1.

9. A control method for a registration determination device for determining whether to register a candidate image which is a registration candidate of a target image, as a registered image that is registered in advance in order to perform image recognition of a target, the control method comprising:
   a candidate obtaining step for obtaining the candidate image;
   an identifying step for identifying discrimination information corresponding to the candidate image obtained in the candidate obtaining step; a feature quantity calculating step for calculating a feature quantity of the candidate image obtained in the candidate obtaining step;
   an in-class variance calculating step for calculating, with regard to the candidate image and a registered image in a same class corresponding to the discrimination information identified in the identifying step, an in-class variance of a feature quantity of the candidate image calculated in the feature quantity calculating step and a feature quantity based on registration information of the registered image stored in a storage unit that stores the registration information that is at least one of a feature quantity and image data of the registered image in association with discrimination information for discriminating each target, or an in-class variance of a degree of similarity between the feature quantity of the candidate image and the feature quantity of the registered image;
   an inter-class variance calculating step for calculating, with regard to registered images in a plurality of classes respectively corresponding to a plurality of pieces of discrimination information, an inter-class variance of the feature quantity of the candidate image and feature quantities of the registered images based on registration information of the registered images stored in the storage unit or the inter-class variance of the degree of similarity between the feature quantity of the candidate image and feature quantities of the registered images;
   a variance ratio calculating step for calculating a variance ratio which is a ratio between the in-class variance calculated in the in-class variance calculating step and the inter-class variance calculated in the inter-class variance calculating step; and
   a registration step, in which when the calculated variance ratio calculated in the variance ratio calculating step satisfies a preset condition, the candidate image is registered as the registered image to the storage unit in such a manner that the registration information of the registered image is associated with the discrimination information identified in the identifying step.

10. A control program stored on a non-transitory computer readable medium for causing a registration determination device to determine whether to register a candidate image which is a registration candidate of a target image, as a registered image that is registered in advance in order to perform image recognition of a certain target, the control program causing a computer to execute: a candidate obtaining step for obtaining the candidate image;
   an identifying step for identifying discrimination information corresponding to the candidate image obtained in the candidate obtaining step; a feature quantity calculating step for calculating a feature quantity of the candidate image obtained in the candidate obtaining step;
   an in-class variance calculating step for calculating, with regard to the candidate image and a registered image in a same class corresponding to the discrimination information identified in the identifying step, an in-class variance of a feature quantity of the candidate image calculated in the feature quantity calculating step and a feature quantity based on registration information of the registered image stored in a storage unit that stores the registration information that is at least one of a feature quantity and image data of the registered image in association with discrimination information for discriminating each target, or an in-class variance of a degree of similarity between the feature quantity of the candidate image and the feature quantity of the registered image;
   an inter-class variance calculating step for calculating, with regard to registered images in a plurality of classes respectively corresponding to a plurality of pieces of discrimination information, an inter-class variance of the feature quantity of the candidate image and feature quantities of the registered images based on registration information of the registered images stored in the storage unit or the inter-class variance of the degree of similarity between the feature quantity of the candidate image and feature quantities of the registered images;
   a variance ratio calculating step for calculating a variance ratio which is a ratio between the in-class variance calculated in the in-class variance calculating step and the inter-class variance calculated in the inter-class variance calculating step; and
   a registration step, in which when the calculated variance ratio calculated in the variance ratio calculating step satisfies a preset condition, the candidate image is registered as the registered image to the storage unit in such a manner that the registration information of the registered image is associated with the discrimination information identified in the identifying step.

* * * * *